(12) United States Patent
Lyons et al.

(10) Patent No.: US 8,401,950 B2
(45) Date of Patent: Mar. 19, 2013

(54) OPTIMIZING PORTFOLIOS OF FINANCIAL INSTRUMENTS

(75) Inventors: Chisoo S. Lyons, San Rafael, CA (US); Eric C. Wells, Berkeley, CA (US); Lu Gao, American Canyon, CA (US); Bogdan E. Popescu, Hercules, CA (US)

(73) Assignee: Fair Isaac Corporation, Minneapolis, MN (US)

( * ) Notice: Subject to any disclaimer, the term of this patent is extended or adjusted under 35 U.S.C. 154(b) by 371 days.

(21) Appl. No.: 12/693,377

(22) Filed: Jan. 25, 2010

(65) Prior Publication Data

US 2011/0184884 A1   Jul. 28, 2011

(51) Int. Cl.
   *G06Q 40/00* (2012.01)
(52) U.S. Cl. ............................ 705/36 R; 705/35; 705/37
(58) Field of Classification Search ............... 705/35–37
   See application file for complete search history.

(56) References Cited

U.S. PATENT DOCUMENTS

| | | | | |
|---|---|---|---|---|
| 5,930,762 A * | 7/1999 | Masch | ........................ | 705/7.28 |
| 7,756,770 B2 * | 7/2010 | Dembo et al. | .............. | 705/36 R |
| 7,831,494 B2 * | 11/2010 | Sloan et al. | .................. | 705/36 R |
| 2002/0147671 A1 * | 10/2002 | Sloan et al. | ..................... | 705/36 |
| 2007/0124227 A1 * | 5/2007 | Dembo et al. | .............. | 705/36 R |
| 2008/0243719 A1 * | 10/2008 | Shavit et al. | ................. | 705/36 R |
| 2009/0307149 A1 * | 12/2009 | Markov et al. | .............. | 705/36 R |
| 2010/0010938 A1 * | 1/2010 | Dundas et al. | ............... | 705/36 T |
| 2010/0198750 A1 * | 8/2010 | Ron et al. | ..................... | 705/36 T |
| 2010/0293107 A1 * | 11/2010 | Sudjianto et al. | ........... | 705/36 R |
| 2011/0071857 A1 * | 3/2011 | Malov et al. | ...................... | 705/4 |

\* cited by examiner

*Primary Examiner* — Jagdish Patel
*Assistant Examiner* — Sara C Hamilton
(74) *Attorney, Agent, or Firm* — Mintz, Levin, Cohn, Ferris, Glovsky and Popeo, P.C.

(57) ABSTRACT

A decision model is applied to a set of current data from a mortgage portfolio to generate a first portfolio metric. The decision model is formed from a network of a plurality of predictive models that are trained on historical data derived from a plurality of mortgage account profiles for a plurality of mortgages within the mortgage portfolio. One or more of the predictive models is an action-based predictive model allowing modification of at least one attribute affecting performance of the mortgage portfolio. One or more of the attributes can be modified and a second portfolio metric can then be optimized, using the decision model, in light of at least one constraint (which can be user-defined). Related techniques, apparatus, systems, and articles are described.

8 Claims, 23 Drawing Sheets

OPTIMIZING PORTFOLIOS OF FINANCIAL INSTRUMENTS

FIELD

The subject matter described herein relates to optimizing portfolios of financial instruments, and, more specifically to the optimization of a portfolio of mortgage loans.

BACKGROUND

In 2008, most of the United States lenders managing mortgage portfolios were adversely affected by a financial crisis rooted in the collapse of the real estate market and the resulting financial disaster caused thereby. For example, according to one study, in 2008 more than 2.3 million consumers faced foreclosure proceedings, and as of February 2009, 8 million American homes were at risk of foreclosure.

In 2009, the American economy experienced a rebalancing which will, at least in the short run, has caused individual and institutional pain. All stakeholders in the mortgage and housing crises have suffered. It appears likely that all the stakeholders are in for more suffering in the future. For example, in the next three years (between 2009 and 2011), nearly $100 billion in adjustable-rate mortgages will reset to unsupportable levels as the shrinking economy and strained credit market rob consumers of their ability to refinance.

Some of the distressed borrowers, arguably, should never have been granted mortgages in the first place. Other borrowers are too hobbled by financial reverses or hobbled with overextended credit to support even modified payments. There is a good argument that foreclosure is the proper path for them. However, these borrowers are in the minority of troubled borrowers.

For the vast majority of other troubled borrowers, policy makers, politicians, and most stakeholders feel that loan modification is considered the best way to keep consumers in their homes today and going forward, while mitigating losses to lenders, servicers, investors, taxpayers, and society. However, the current landscape is rife with examples of unfair extremes with respect to loan modifications. Some "modifications" are simply rearrangements of mortgages that are too large for the reduced value of underlying property. These often result in re-default. At the other end of the spectrum are so-called "cram downs," heatedly opposed by the mortgage industry, in which bankruptcy judges order reductions in loan principal to reflect the reduced value of the home. Depending on the size of the principal reduction, this may deprive investors of fair profits.

In addition, the best, well-intentioned attempts by multiple stakeholders to stabilize the housing market through mass loan modification programs have fallen woefully short. In 2009, for example, there were at least eight different "major" modification programs underway, sponsored by mortgage lenders and servicers, Fannie Mae/Freddie Mac, the FDIC, and consumer advocates. None has gained sufficient traction to put a floor under housing prices, which would in turn put a floor under the U.S. economy. Some programs attracted few modification applications. Others have resulted in six-month re-default rates as high as 55 percent.

Therefore, there is a need for an apparatus and method capable of crafting loan modifications that are fair to borrowers, lenders, and investors in hopes of slowing or halting the mortgage crisis and, hopefully, reversing the economy's decline.

SUMMARY

In one aspect, a decision model is first applied to a set of current data from a mortgage portfolio to generate a first portfolio metric. The decision model can be formed from a network of a plurality of predictive models that are trained on historical data derived from a plurality of mortgage account profiles for a plurality of mortgages within the mortgage portfolio. The historical data can characterize actions taken on mortgages in the mortgage portfolio. At least one of the predictive models is an action-based predictive model allowing modification of at least one attribute affecting performance of the mortgage portfolio. Thereafter, data modifying at least one attribute from one of the action-based predictive models is received. The decision model is then applied (a second time) to the set of current data from the mortgage portfolio with the modified at least one attribute from one of the action-based predictive models to generate a second portfolio metric. A selection of the modifiable attributes from the action-based predictive models can be optimized to maximize or minimize the second portfolio metric taking into account a constraint to the optimization. Data characterizing the optimized second portfolio metric can then be provided (e.g., displayed, transmitted, persisted, etc.).

The data modifying an attribute from one of the action-based predictive models can be user-generated and obtained via a graphical user interface. At least one variable can be derived from the historical data that acts as a decision key.

At least one statistical relationship can be established between a projection of a major economic indicator variable and mortgage performance so that stress testing functionality can incorporate varying values of the economic indicators.

The constraint can be applied by applying a global constraint that applies to substantially all the mortgages in the mortgage portfolio. The constraint can alternatively be applied by applying a local constraint that applies to a subset of the mortgage in the mortgage portfolio.

Values of the attributes can be varied to evaluate sensitivity of the decision model. Optimal actions can be assigned to apply to a plurality of mortgages of the mortgage portfolio for carrying out an optimized strategy.

At least one global constraint can be varied for different levels of strength with such global constraints applying to substantially all of the mortgage in the mortgage portfolio. Actions in the mortgage portfolio can be optimized for each of the levels of strength. A corresponding value of an objective function can be obtained for each of the optimized actions, to allow, for example, a graphically depiction of a set of achievable points of a corresponding set of optimized strategies.

An area of one or more of the plurality of predictive models having less than a desired amount of data can be identified. The decision model can then be used to assess the identified area to determine if the area represents a potentially profitable segment of an action space. Optimal experimental design can be used to produce a data collection strategy that minimizes cost and maximizes the value of information. Data in the area identified as having less than a desired amount of data can then be collected so that it may be used to rebuild corresponding parts of the prediction models that compose the network of the decision model.

The predictive models can comprise global predictive models built on all of the mortgages in the mortgage portfolio. The predictive models can comprise segmented predictive models built on a subset of mortgages in the mortgage portfolio.

In an interrelated aspect, data characterizing a constraint on a mortgage portfolio is received. A decision model is applied to a set of current data from the mortgage portfolio to optimize a first portfolio metric in light of the constraint. The decision model is formed from a network of a plurality of predictive models. The predictive models are trained on historical data derived from a plurality of mortgage account profiles for a plurality of mortgages within the mortgage portfolio. The historical data characterize actions taken on mortgages in the mortgage portfolio. At least one of the predictive models is an action-based predictive model allowing modification of at least one attribute affecting performance of the mortgage portfolio. Thereafter, data characterizing changes to the mortgage portfolio required to realize the first portfolio metric are provided. The constraint can apply to substantially all of the mortgages in the mortgage portfolio or a subset.

Articles of manufacture are also described that comprise computer executable instructions permanently stored on computer readable media, which, when executed by a computer, causes the computer to perform operations herein. Similarly, computer systems are also described that may include a processor and a memory coupled to the processor. The memory may temporarily or permanently store one or more programs that cause the processor to perform one or more of the operations described herein.

The subject matter described herein provides many advantages. For example, the current subject matter enables crafting of loan modifications that are fair to borrowers, lenders, and investors in hopes of slowing or halting the mortgage crisis and, hopefully, reversing the economy's decline.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

Disclosed are apparatus and methods that include technologies to allow a mortgage portfolio manager to more optimally manage a particular portfolio of mortgages to substantially optimize across competing objectives (such as both short term objectives as well as long term objectives) by utilizing a decision model that captures the dynamic between lender actions and resulting customer performance. It should be noted that although mortgages are the financial loan instrument discussed herein, the technologies are equally applicable to other financial loan instruments and to the modification thereof. For example, the apparatus and methods discussed herein could be applied to different other actions, including refinancing of any type of loan, loan modifications to home equity lines of credit (HELOC), loan modifications to adjustable rate mortgages (ARMs), and the like. In addition, the apparatus and methods discussed herein can also be applied at different points in the mortgage cycle, such as for helping to determine loan originations, for managing other aspects of the mortgage account at various points during the life of the loan, and the like.

Figure 1:
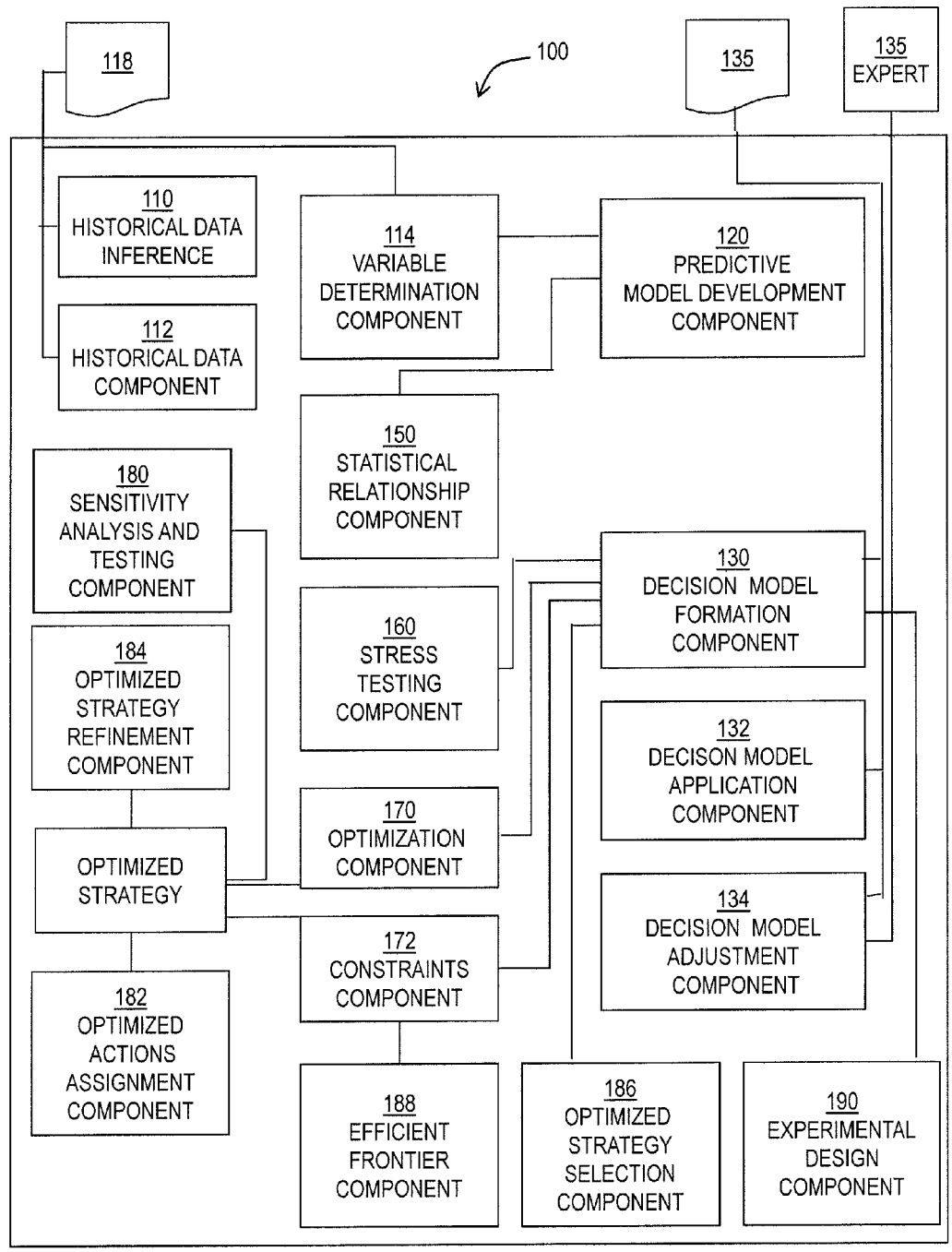
FIG. 1 is a schematic diagram of a computer system.

FIG. 1 is a schematic view of a system, such as a computer system, 100 for predicting at least one outcome for a mortgage portfolio. The system 100 includes a historical data inference component 110, a historical data action component 112, a variable determination component 114, a predictive model development component 120, a decision model formation component 130, and a decision model application component 132. As used herein, the term component refers to a physically embodied computing system or sub-system. It will be appreciated that in some implementations, the functionality provided by the respective components can be implemented in software. The system 100 includes a source of historical data 118 that relates to a mortgage portfolio. A mortgage portfolio generally will include a multiplicity of mortgages held by a lender. The term mortgages are broadly defined. Mortgages can include traditional mortgages which are a loan secured by the borrower's residence, a refinance of a mortgage, a home equity line of credit (HELOC), and any other similar type of note. The system is not limited to just one type of mortgage.

The historical data inference component 110 is for inferring mortgage account profiles for a plurality of mortgages of the mortgage portfolio. The historical data action component is for processing actions taken on mortgage accounts in the mortgage portfolio. Actions include actions which the lender can control with respect to the plurality of mortgages of the mortgage portfolio. For example, the lender can refinance the note, foreclose on the note, or modify the mortgage. Modification includes changing the terms under which the borrower had to operate or under which the borrower agreed to pay back the note. For example, the lender can lower the principal amount, lower the interest rate, or lengthen the term of payments. The historical data inference component 110 also verifies, cleans, and transforms the historical data.

The variable determination component 114 determines at least one variable from the historical data that correlates with a historical outcome related to the historical data. An outcome may have been the net present value of the portfolio given the income stream from all the mortgages associated with the portfolio. A variable is any item which may affect the outcome. Generally, a variable is most desirable when it is tied closely to an outcome. In other words, it correlates closely with an outcome of interest to the lender. Generally this variable is information about specific consumers who hold mortgages and the outcomes of interest are the ensuing behavior of such consumers. A profession is an example of a non modifiable variable, also known as a non action variable. The lender is unable to explicitly change the borrower's profession. There are other variables that are action type variables. In other words, the lender is able to change these variables. For example, the interest rate can be raised on all or some of the mortgages in an attempt to maximize net present value. This could backfire and result in more foreclosures, which cost money, and more refinancing with other lending institutions. The variable determination component 114 includes a decision key component for determining variables from the historical data that are effective decision keys (non modifiable input variables).

The computer system 100 also includes the predictive model development component 120. The predictive model development component 120 is for developing a plurality of predictive models that include at least one variable and the historical outcome. The predictive models development component 120 can be used to build all types of predictive models. For example, some predictive models can be used to predict intermediate results. For example, if the loan to home value is over 100%, the borrower might be more likely to "walk away" from a property. In other words, the borrower might decide to accept a negative impact on their credit quality as tracked by the Credit Reporting Agencies and lose their invested equity on the mortgage and simply walk away from the property. Other predictive models predict the outcome. The predictive models produced by the predictive model development component can be of several types. A predictive model can be purely based on data, or can be an expert model which is purely based on an expert's knowledge 135 or can be mixed. Other predictive models are economic models. The predictive models may be action based or non action based.

The computer system 100 includes the decision model formation component 130 which is used in forming a decision model 200. The decision model 200 is formed as a network comprised of the plurality of predictive models. This will be described in more detail below. The computer system 100 also includes the decision model application component 132 for applying the decision model to a set of current data 134 to predict an outcome in the future. In other words, the computer system 100 includes a historical portion which studies historical data and arrives at one or more variables which correlate to happenings in the past. These variables can be rated in terms of effectiveness. Once found to be effective, the variables can be studied in current data to predict the future outcome. The outcome, in one implementation, may be a metric related to the mortgage portfolio. Such a metric may be the net present value of the mortgage portfolio such as is shown in the decision model 200.

The system 100 also includes a decision model adjustment component 134 for adjusting the decision model 200 with expert domain knowledge 135. Upon adjustment with expert knowledge, a partially data based decision model 200 is formed (shown in FIG. 2). Adjustments may also be made which simplify the decision model 200.

The system 100 may further include a statistical relationship component 150 for establishing at least one statistical relationship between a projection of a major economic indicator variable and mortgage accounts' performance. The system 100 also includes a stress testing component 160 which incorporates stress testing functionality by varying values of the economic indicators.

The decision model 200 typically will include at least one of the predictive models that include one or more modifiable components of a decision ("attributes"). Action based predictive models always include (either directly or indirectly) modifiable attributes which the lender can modify. The system 100 further includes an optimization component 170 for optimizing the selection of the modifiable attributes to maximize or minimize a mortgage portfolio level metric. The system 100 also includes a constraints component 172 for applying one or more constraints to the optimization. The constraints applied can be global constraints which are applied to substantially all the mortgages accounts in the mortgage portfolio, or local constraints applicable to at least one of the mortgage accounts or a plurality of mortgage accounts in the mortgage portfolio. The constraints component 172 can also be used to apply both global constraints and local constraints to the decision model 200.

The system 100 also includes a sensitivity analysis and testing component 180. The sensitivity analysis and testing component 180 incorporates sensitivity analysis by testing. The sensitivity analysis and testing component 180 can test the effect of varying the value of at least one parameter on an optimized strategy. The system 100 can also include an optimal actions assignment component 182 that assigns optimal actions for carrying out the optimized strategy to a plurality of mortgage accounts of the mortgage portfolio. The system also includes an optimized strategy refinement component 184 which can be used to trim certain actions and simplify the strategy. The system 100 also includes an optimized strategy selection component 186 for selecting a best strategy for deployment. The system 100 also can include an efficient frontier component 188 that creates an efficient frontier by: varying at least one global constraint for different levels of strength, optimizing the mortgage portfolio's optimal actions for each of these levels, obtaining the corresponding optimal value of the objective function for each of these optimization, and graphically depicting a set of achievable points of the optimized strategy.

The system 100 also may include an optimal experimental design component 190 which identifies an area having less than a desired amount of data, and which uses the decision model to identify an area to determine if an area and to determine if such area represents a potentially profitable region of the action space, and uses optimal experimental design to produce a data collection strategy that minimizes cost and maximizes the value of information. The experimental design component 190 also collects data in the area identified as having less than a desired amount of data and uses the collected additional data to rebuild parts of all of the plurality of prediction models that compose the network of the decision model. The data collected by the optimal experimental design component 190 is used to form a next generation decision model; the optimization component 170 is employed to re-optimize the next generation decision model to produce a next generation optimized strategy. The optimized actions of this next generation optimal strategy are assigned using the optimized actions assignment component 182.

The output of the system is a set of actions from the optimal actions assignment component 182 that are optimized to a mortgage portfolio metric, such as net present value. These results can be adjusted to simplify strategies and also adjusted to account for lack of data in certain areas using the experimental design component 190. The experimental design component 190 allows for collecting data for a decision model where there may be no data exemplars for some of the actions. In the mortgage crisis of 2008, there are areas where no historical data has been collected. Because the lenders deal with new set of problems which are being seen for the first time, there is little historical data involving historical actions such as modifying parameters of existing mortgage loans. Consequently, the experimental design component 190 along with expert data 135 can be used to fill these gaps with expert opinion rather than actual current or historical data.

Figure 2:
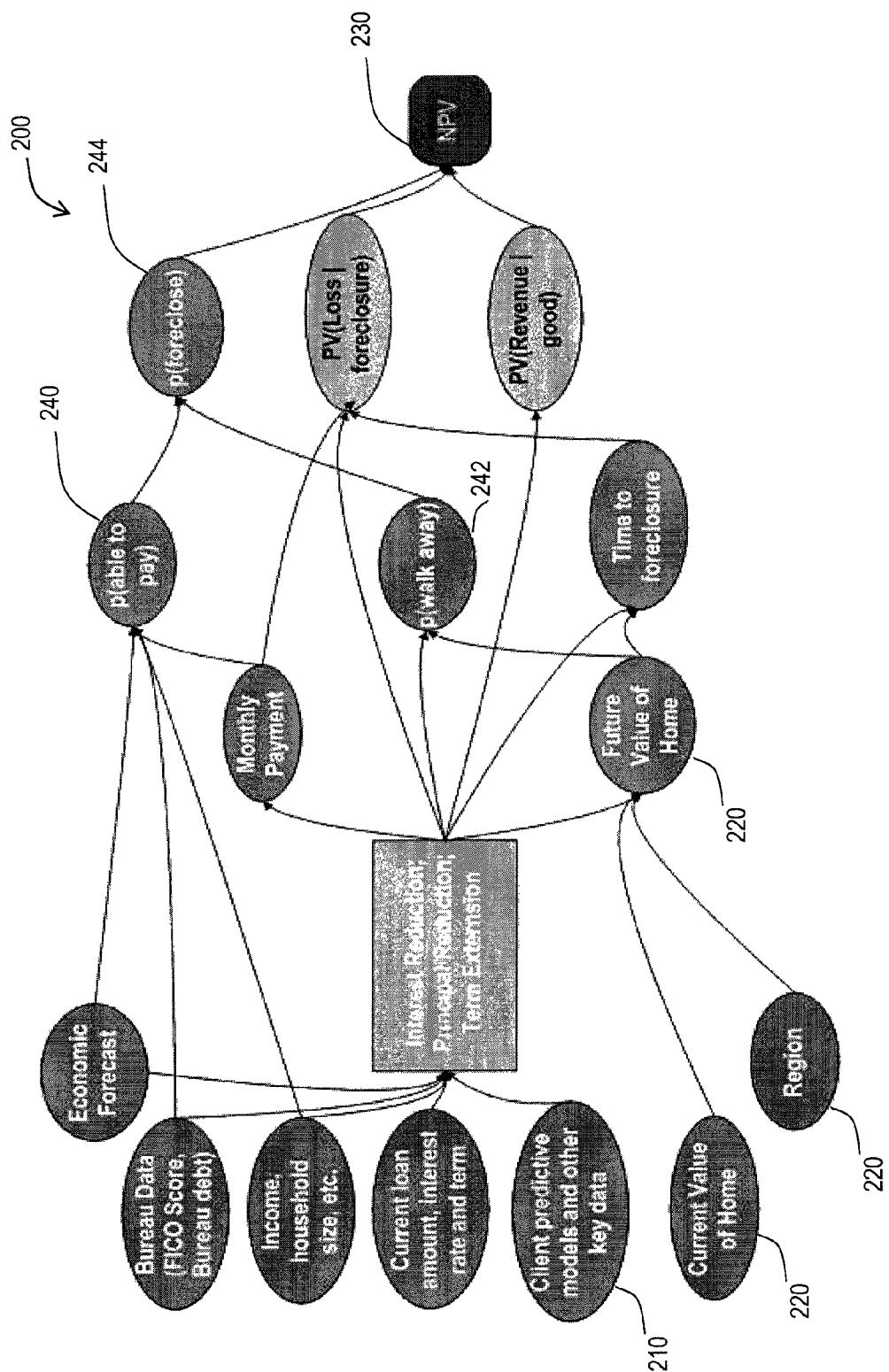
FIG. 2 is a framework for a decision model showing the various influential items on results or actions that a mortgagee can take.
Figure 3A:
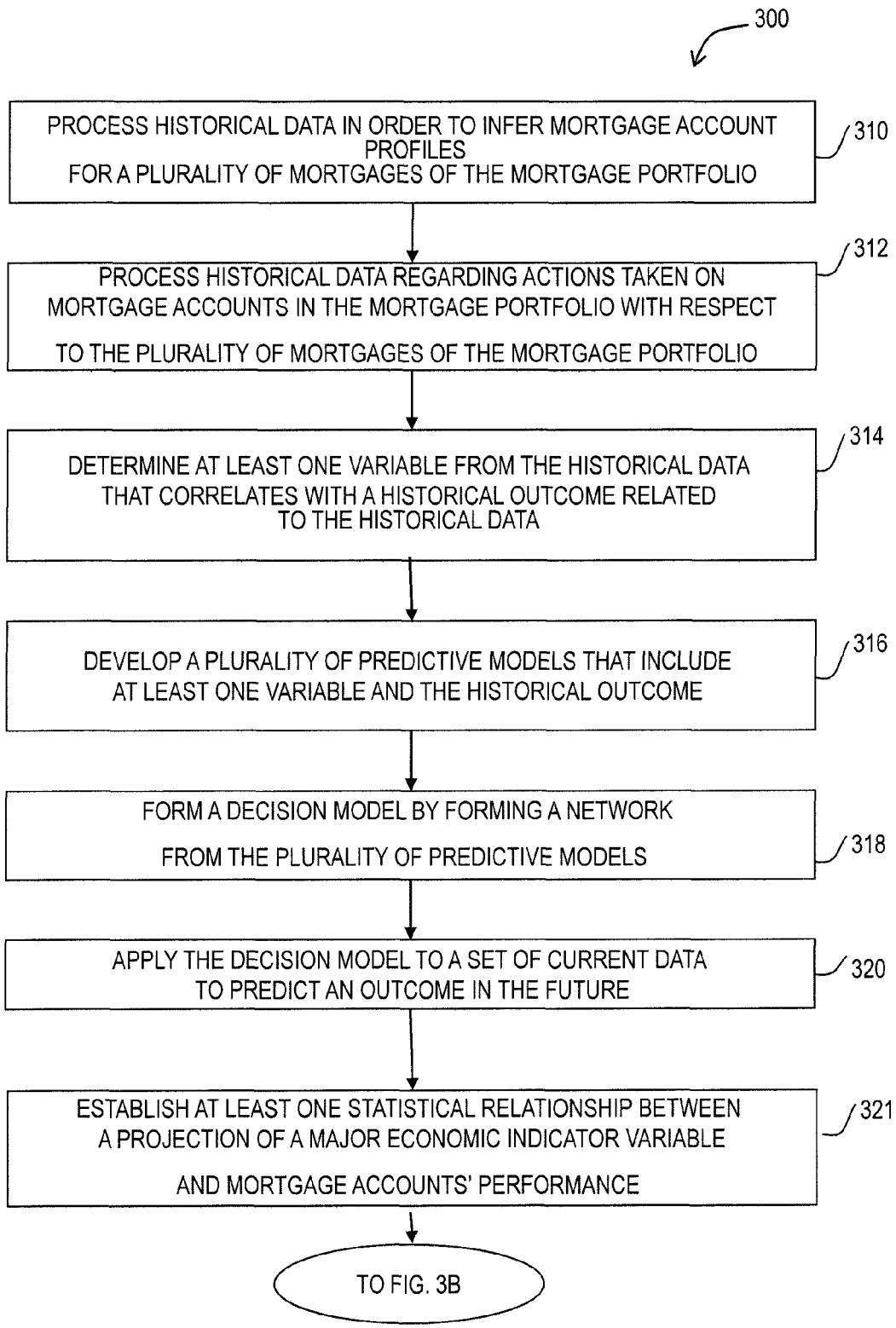
FIGS. 3A-3D is a flow diagram of a computerized method to illustrate the decision-optimization framework.
Figure 3B:
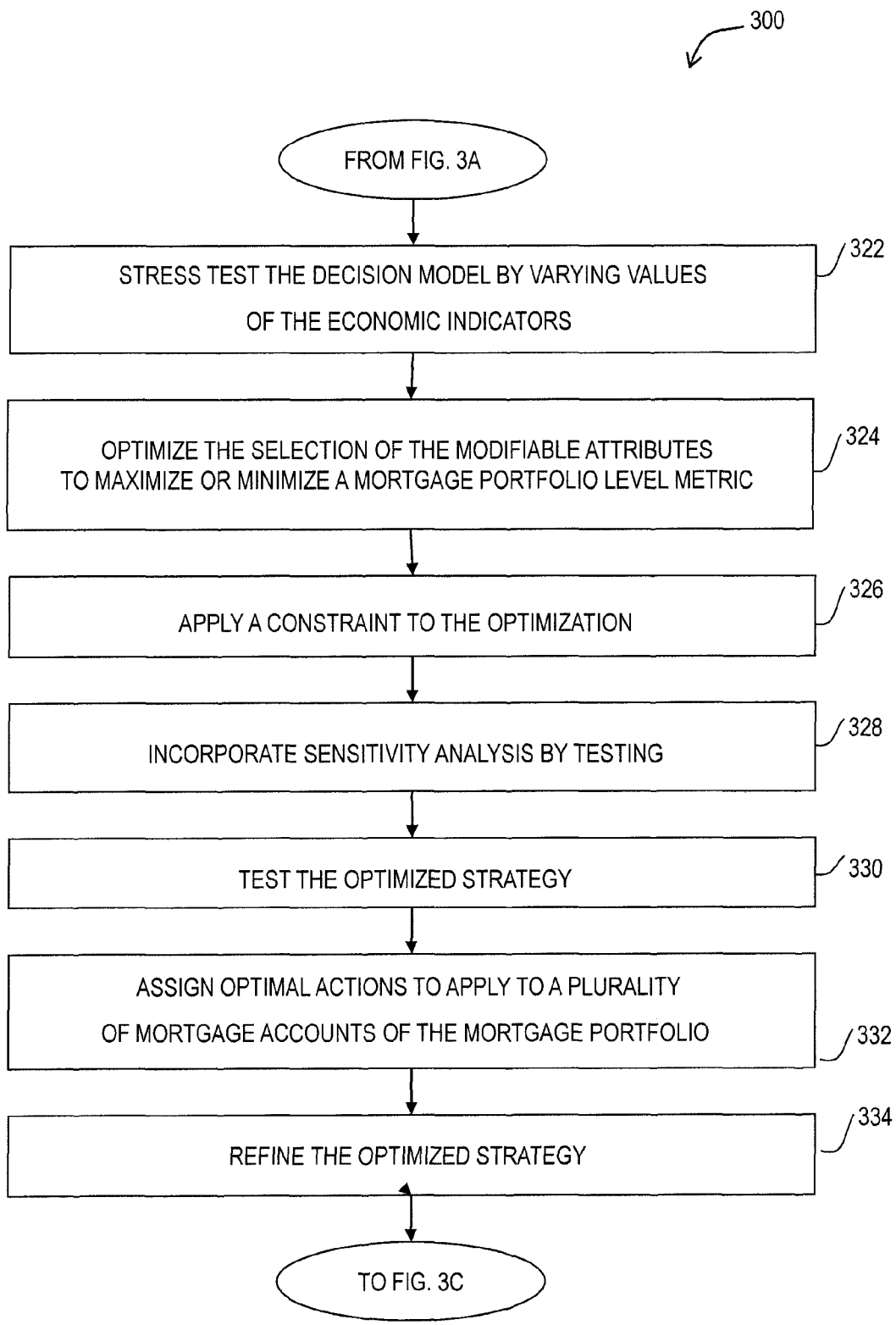
Figure 3C:
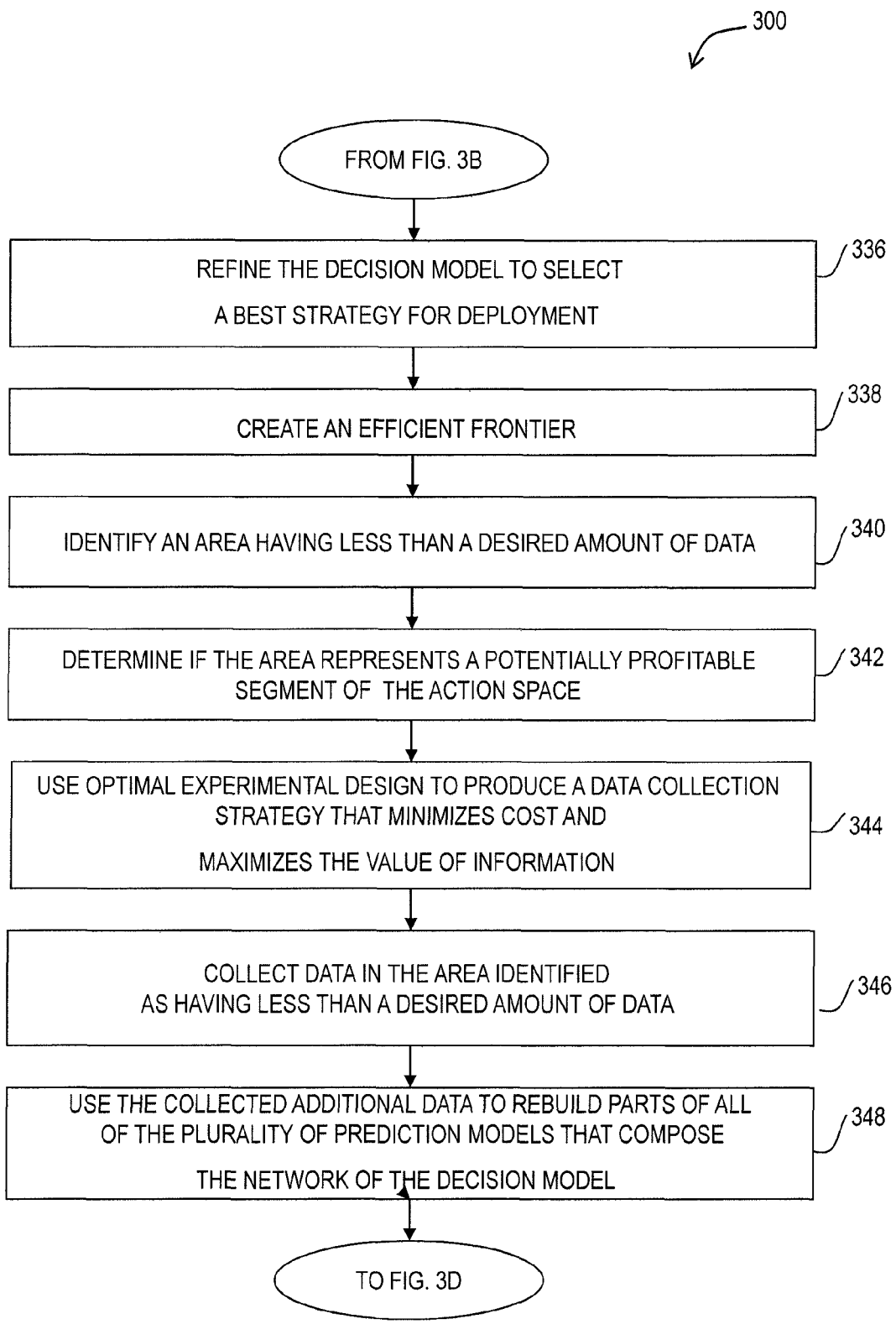
Figure 3D:
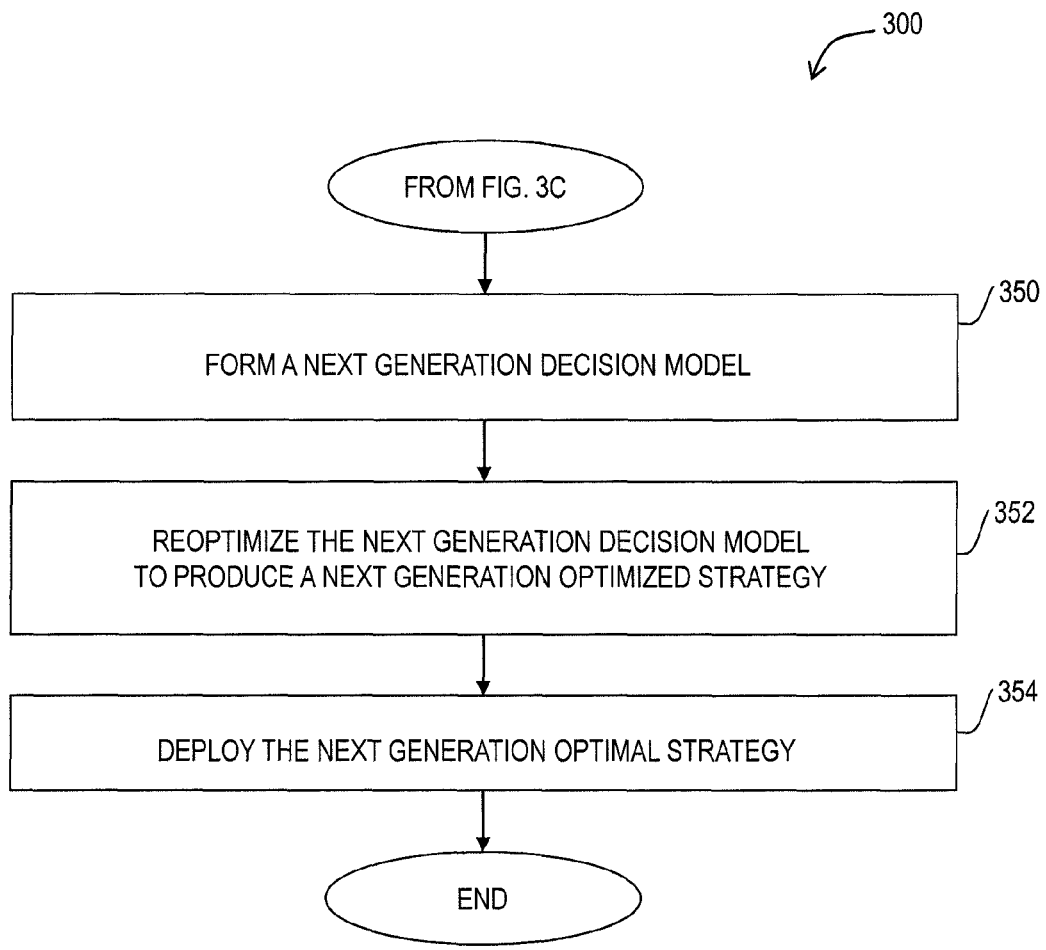

FIG. 2 is a simplified example of a decision model 200. The decision model 200 is a network of predictive models. For example, a lender's predictive models 210 are included in the decision model 200. Other models include a model 220 for predicting the further value of a home based on current value of the home 222 (and optionally the region or location of the home 224). Many of the predictive models, such as 210 and 220, predict intermediate results which are used to predict the overall metric. In this particular example implementation, the overall metric 230 is the net present value (NPV) of the mortgage portfolio. Of course, it should be noted, that other metrics could be used as an overall objective. Other predictive models are used to determine intermediate results such as the probability of the ability to pay 240, the probability of a walk away 242, and the probability of foreclosure 244. The predictive models 240 and 242 are action based models in that certain attributes can be modified by the lender. The attributes that can be modified are with respect to interest rate, principal and term of the mortgage. In this particular time, interest rates may be reduced, term of the mortgage extended and the principal amount reduced to increase the borrower's ability to make a payment.

FIG. 3 is a flowchart for a computerized method 300 for predicting at least one outcome to a mortgage portfolio and optimizing the portfolio of mortgages. The computerized method includes processing historical data in order to infer mortgage account profiles for a plurality of mortgages of the mortgage portfolio 310, processing historical data regarding actions taken on mortgage accounts in the mortgage portfolio with respect to the plurality of mortgages of the mortgage portfolio 312, and determining at least one variable from the historical data that correlates with a historical outcome related to the historical data 314. The method 300 further includes developing a plurality of predictive models that include at least one variable and the historical outcome 316, forming a decision model by forming a network from the plurality of predictive models 318 and applying the decision model to a set of current data to predict an outcome in the future 320. The processing of historical data in order to infer mortgage account profiles for a plurality of mortgages of the mortgage portfolio 310 includes verifying, cleansing, and transforming the historical data. This eliminates duplicate, dirty or irrelevant data (such as irrelevant variables) and other problems that may slow the computing process for determining predictive models, forming the decision model and yielding the result related to a desired metric of the mortgage portfolio. Determining at least one variable from the historical data 314 includes determining variables from the historical data that are effective decision keys or intermediate variables/metrics.

In some implementations, developing the plurality of predictive models 318 includes developing an expert model. An expert model is one based on the opinion or findings of an expert rather than based on actual empirical data. In some implementations, such a predictive model can be based purely on expert opinion. Such models are referred to as purely expert predictive models. In other implementations, the expert opinion can be used along with empirical data. This is referred to as a mixed model or can be thought of as adjusting the decision model with expert domain knowledge to form a partially data based decision model. In some implementations, at least one of the plurality of predictive models is an economic model. The computerized method 300 produces an outcome, such as 230 (see FIG. 2). In one implementation, the outcome is a metric related to the mortgage portfolio.

At least one of the plurality of prediction models developed in the method 300 is action based. Others are non action based. Other predictive models are economic models. Action based predictive models have attributes which can be varied by the lender or are within the lenders control to change. Non action based predictive models rely on attributes over which the lender has little, if any control. For example, a predictive model may depend on a credit score, such as the FICO credit score produced by FICO of Minneapolis, Minn. The lender can not explicitly change this score. When one or more of the predictive models used in the computerized method 300, the method further includes establishing at least one statistical relationship between a projection of a major economic indicator variable and mortgage account's performance 321, and stress testing the decision model 322 (see FIG. 2 for an example decision model 200) by varying values of the economic indicators.

When at least one of the predictive models includes one or more modifiable attributes, the computerized method 300 further includes optimizing the selection of the modifiable attributes to maximize or minimize a mortgage portfolio level metric 324. Sometimes an optimization is run without constraints. In other implementations, the method 300 includes applying one or more constraints to the optimization 326. Applying constraints to the optimization 326 includes applying at least one global constraint that applies to substantially all the mortgages accounts in the mortgage portfolio or applying at least one local constraint that applies to at least one of the mortgage accounts in the mortgage portfolio. In many instances, the local constraints apply to a plurality of mortgage accounts in the mortgage portfolio. An example of a local constraint could be to apply mortgage modifications only to loans in one particular state. This may be done to comply with certain laws or may be done merely at the desire of the lender. Of course, in some implementations, a plurality of global constraints and local constraints may be applied to the decision model.

In still other implementations, the computerized method 300 further includes incorporating sensitivity analysis by testing 328. This element can be accomplished by testing the effect of varying the value of at least one parameter on an optimized strategy. The computerized method 300 may also include evaluating the optimized strategy 330. The computerized method 300 also includes assigning optimal actions to apply to a plurality of mortgage accounts of the mortgage portfolio 332. The optimal actions are for carrying out the optimized strategy. The computerized method 300 may further include refining the optimized strategy 334, and refining the decision model to select a best strategy for deployment 336.

Further implementations of the computerized method 300 include the creation of an efficient frontier 338. The efficient frontier 338 is created by varying at least one global constraint for different levels of strength, optimizing the mortgage portfolio's optimal actions for each of these levels; and obtaining the corresponding optimal value of the objective function for each of these optimizations. The results are a set of achievable points with respect to the optimized strategy which may be graphically depicted.

Other implementations of the computerized method 300 include identifying an area having less than a desired amount of data 340, using the decision model to assess the identified area to determine if the area represents a potentially profitable segment of the action space 342, using optimal experimental design to produce a data collection strategy that minimizes cost and maximizes the value of information 344, collecting data in the area identified as having less than a desired amount of data 346, and using the collected additional data to rebuild parts of all of the plurality of prediction models that compose the network of the decision model 348. The computerized model 300 further includes forming a next generation decision model 350, reoptimizing the next generation decision model to produce a next generation optimized strategy 352, and deploying the next generation optimal strategy 354.

Various implementations of the subject matter of the method and apparatus described above may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the method and apparatus described above may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The methods and apparatus described and contemplated above may be implemented in a computing system that includes a back-end component (e.g., as a data server), or that includes a middleware component (e.g., an application server), or that includes a front-end component (e.g., a client computer having a graphical user interface or a Web browser through which a user may interact), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Figure 4:
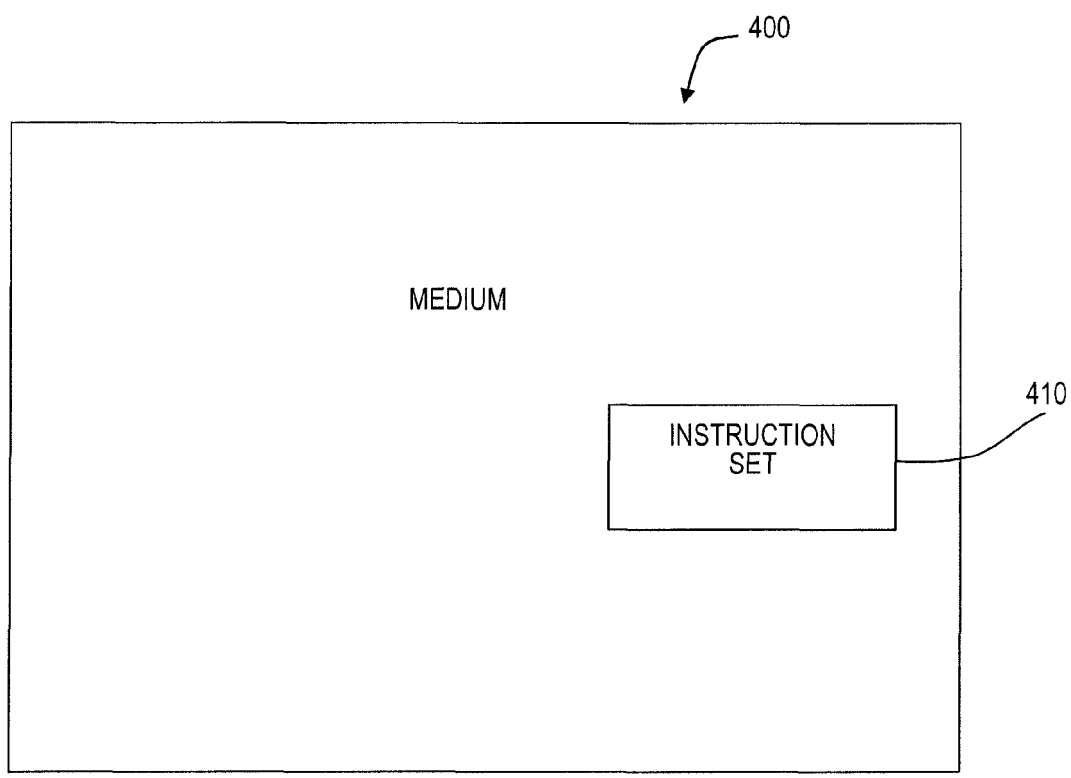
FIG. 4 is a schematic representation of a machine-readable medium that includes a set of instructions for causing a machine, such as a computing system, to follow the set of instructions.

The instruction sets for operating the machines, as discussed above, may be provided on a machine-readable medium. FIG. 4 is a schematic representation of a machine-readable medium 400 that includes a set of instructions 410 for causing a machine, such as a computing system 100 to follow the instructions. The instructions 410 will cause a machine, such as a computer or computer processor, to perform many aspects of the method 300 discussed above.

EXAMPLE IMPLEMENTATION

1) Empirical, Expert and Data Guided Modeling

The technology described in this document can be implemented in a context where historical data is available or in expert settings where one can simulate some or all the data according to expert distributions and parameters.

Predictive technologies have always relied heavily on data. Relying only on data and aiming to use as much data as can be possibly obtained has two main drawbacks. The first is that the marginal value of the additional data may not be worth their cost. The second, even more important drawback is that reliance only on existing data severely limits the model and the considered alternatives or strategies. For example, if the mortgage decision maker limits herself to only existing data, she is inherently limited (in the first stage) to actions that have been pursued in the past, missing possibly other more meaningful actions. Introducing expert opinion in modeling, in addition to available data, typically will allow for much better models and strategies. Sequentially, data will be collected and the model will be updated accordingly. This puts a larger weight on the initial expert opinion or judgment when these data are relatively few, and a lower weight when data become abundant.

There are cases when various relationships that make up the Decision Model are initially obtained from the empirical data. However, especially when dealing with actions (e.g., Interest Rate Reduction, Principal Reduction) it is sometimes the case that historical data does not have a satisfactory coverage (for example certain segments of the accounts did not historically receive loan modifications, such as reducing the interest rate or principal). In such cases either experimentation can be employed (assign actions in a test setting and monitor performance) or a data guided approach can be used or expert knowledge can be injected. In a data guided approach the user of the methodology will carefully examine the existing data and fill in any data holes by interpolating or extrapolating from the existing data patterns.

2) Data

The data employed for this technology comes from sources relevant for the Mortgage Portfolio Analytics. Such examples include but are not restricted to "Bank Mortgage Master File Data", "Credit Bureau Data", "Income Data" and "Economy Data".

2.1) Bank Mortgage Master File Data

This data is account level data, where an account corresponds to a mortgage loan (e.g., primary mortgage, secondary mortgage, HELOC, etc).

Examples of Master File Data Attributes are:
Interest Type at Origination (e.g., Fixed Mortgage, ARM)
Interest Type in Current Month
Original Loan Amount
Unpaid Principal Balance
Original Interest Rate
Current Interest rate
Original LTV (Loan To Value)
Refreshed (current) LTV
Original FICO Score
Current FICO Score
Documentation (e.g., Full, Alt/Low, Stated)
Property Location (e.g., State, ZIP Code)
Foreclosure Status
Bankruptcy Status
Owner Occupancy Flag
DTI: Dept to Income (the percent of a borrower's total monthly debt payments (including proposed housing expenses) divided by his or her gross monthly income, used to determine the mortgage amount that qualifies a borrower)
Balloon term (for mortgages with a final balloon payment)

2.2) Credit Bureau Data

This data characterizes the consumer and represents a summarization of the financial history and obligations for the individual(s) borrowers of the mortgage loan(s). The Credit Bureau Data is not restricted to the Mortgage trade lines; it includes information about all the trade lines from the present and past history of the consumer: e.g., credit cards data, auto loans, installment loans etc.

Examples of Credit Bureau Data Attributes are:
Average Months on File
Total Balance (over all open trade lines)
Total Revolving Balance
Total Credit Limit
Utilization (Total Balance/Total Credit Limit)
Industry of Oldest Trade Line
Maximum Delinquency on any Trade Line
Months since Last Collection Inquiry
Months since last 30+/60+/90+/120+Days Delinquency
Number of Trade Lines
Number of Revolving Trade Lines
Number of Trade Lines 30+/60+/90+/120+Days Delinquent Ever
Number of Inquiries last 6/12 months
Number of Trade Lines Open last 12 months
Number of Active Trade Lines Currently/Ever Delinquent 2.3) Income Data Income data is very informative when dealing with analytics for mortgage portfolios. Although income data is sometime available at the moment of originating the mortgage loan, this is often too old and inaccurate in depicting the current income of the borrower.

Therefore it is sometime valuable to append to the previously mentioned data sources Income Data at individual and/or Household level.

2.4) Economy Data

Examples of economic data that are useful in analytically modeling the Mortgage Portfolios problems are: default interest rate, housing price index, unemployment rate and national level debt-to-income ratio.

Home prices significantly influence the behavior of the mortgage accounts from a given portfolio. This data can be obtained from various sources amongst which we cite here Economy.com and FHFA. Economy.com (www.economy.com) estimates historical data for median existing single-family home prices for all counties, metropolitan areas and states. The data has a quarterly periodicity as far back as the early 1970s depending on the area. FHFA (www.fhfa.gov): the US Federal Housing Finance Agency (formerly Office of Federal Housing Enterprise Oversight aka OFHEO) publishes the HPI index, a quarterly broad measure of the movement of single-family house prices. The HPI is a weighted, repeat-sales index, meaning that it measures average price changes in repeat sales or refinancing on the same properties in the various metropolitan statistical areas.

It should be pointed out that the data listed above is merely an example of the types of data that can be used. Different implementations can use additional data sources that are not mentioned in this section. Examples of other data include individual Credit Card Master File Data, Demographic Data, and the like.

3) Decision Model Overview

The decision model 200 represents the summation of the analytical relationships being modeled, in particular providing the precise mathematical formulas connecting lender actions taken on specific customer types to the resulting performance or behavior of those customers and ultimately the total portfolio. An intuitive, visual representation of the decision model is the Decision Model Influence Diagram. FIG. 2 depicts an example of a decision model relevant for optimizing loan modification actions for mortgage portfolios.

This example as well as the technical narrative throughout the document represents a simplified version of an actual decision model used for mortgage portfolio optimization.

While the actual models employed can be more complex in terms of decision keys, intermediate models and metrics employed, the methodology described here generalizes in a straightforward manner to these more complex situations.

Again, it should be noted that this decision model 200 is merely an example. An actual decision model 200 can be more complex or simpler.

The Influence Diagram is a powerful tool in modeling decision problems since an analyst is allowed to structure and visualize fairly complex problems in a compact graph that explicitly conveys the assumed dependence or independence among variables, the sequence of decisions, and the flow of information to the decision maker. The example Influence Diagram indicates that the metric to optimize in the example in FIG. 2 is NPV: Net Present Value of the Portfolio. Intermediate metrics such as probability of a foreclosure, dollar loss given foreclosure and revenue for the non-delinquent accounts are components that enter the NPV calculation. It could be the case that other metrics, for example portfolio level loss due to foreclosure, can be used as an objective function.

Some of these intermediate metrics will depend on other intermediate metrics (e.g., in the Influence Diagram in FIG. 2 probability of foreclosure depends on the probability of being able to pay and on the probability of walking away due to "willingness to pay": e.g., it is commonly agreed that mortgage account holders may walk away from home simply due to losing their incentive of paying because the house value is considerably lower than the mortgage amount owed) or on actions and decision keys.

Actions depicted in the Influence Diagram from FIG. 2 are Interest Reduction, Principal Reduction and Term Extension, in all possible combinations. Besides the examples provided here for illustration purpose, other actions that are supported can include but are not limited to: Refinance (with different treatments here depending on the refinancing terms) Short Sale, Deed in Lieu, Foreclosure, and Change of Type of Loan (e.g., from ARM to conventional, etc) and others.

Decision keys are historical, non action, variables that describe the profile of each account or account holder. Examples of such features are provided in Section 2. The Influence Diagram from FIG. 2 depicts some illustrative examples that can be either raw data elements: such as income, household size, current loan amount, current house value, as well as derivations or models summarizing raw data elements: e.g., FICO Score, and the like. In addition, decision keys can include custom models such as proprietary scores, or models owned by the lender that manages the given portfolio.

4) Data Mining and Data Reduction

The first step towards building the Decision Model 200 in an empirical setting is to perform data cleaning and data reduction.

Data cleaning is necessary as oftentimes there are data errors that need to be detected so that the analytics based on the data will be sound.

Data reduction is a step that is often employed when the size of historical data is too large. Reduction can be achieved both in terms of number of records as well as in the number of features; the latter is sometimes called dimensionality reduction.

A particular time window (e.g., 36 months, 48 months, or the like) is established and only the observations falling into that time window are considered for analysis. This data can be used both for defining an "observation window" (e.g., define predictive variables using data in the window), for defining a "performance window" (e.g., define a particular performance such as going delinquent in this performance window), for training or for evaluating a statistical model.

Sampling is sometimes employed both to reduce the dataset as well as to stress/weight observation from a particular segment. When determining the sampling scheme the distribution of the data is preferably taken into account, whenever possible. For example, if 80% of the historical data received the same treatment (i.e., combination of actions, see Section 1) it might be convenient to undersample this segment, as considering all the records might not provide much more incremental information for driving the optimal decision, when compared with a smaller sample. On the other hand, it is preferable to oversample certain segments that may be of special interest, such as segments that appear to be particularly influential in understanding the action reaction mechanics of the accounts in the portfolio.

It is sometimes the case that the raw historical data has hundreds or thousands of fields, especially when data from more than one source is available (see Section 2). In this case, dimensionality reduction is recommended. Sometimes domain knowledge is applied to reduce the dimensionality by only including variables deemed by the experts as important for the analytics of the Mortgage Portfolios. In addition to this or in lieu of this expert dimensionality reduction Data Driven Multivariate Dimensionality techniques can be employed. Examples are Principal Component Analysis, Factor Analysis, Discriminate Analysis, Stepwise Regression, etc.

Data with a large number of variables often exhibit a high degree of linear relationships (covariance or correlation) among the observed variables. It is often useful to try to use these relationships to help reduce the dimensionality (number of variables) of the data by squeezing out the redundant information (due to the related nature of the variables) represented by the many variables. The reduced dimensionality may facilitate expedient exploratory data investigation and modeling.

Principal component analysis and factor analysis are two related data analysis techniques that help reduce the dimensionality of the data by utilizing the linear relationship between variables. Factor analysis may provide further insight into potential grouping schemes for the observable variables. While the two techniques are not modeling techniques per se, the results of principal component analysis and factor analysis can be used as part of other modeling techniques. Both techniques, given their utilization of correlation or covariance between variables, are only applicable to continuous-valued variables Examples of continuous variables are Average Months on File, Total Balance (over all open trade lines), Total Revolving Balance, and Total Credit Limit.

Segmentation and clustering techniques can be employed. They are however addressed in detail in Section 8 below. It should be noted that the above treatments of cleansing, verifying, and otherwise treating the data are merely examples provided for this discussion. It should be understood that the current subject matter can employ other techniques for Data Mining in addition to those discussed above.

5) Actions Space and Treatments

Examples of decisions to be optimized over in a portfolio of mortgages are the following actions that apply at the account level (e.g., for any mortgage loan in the portfolio):

Interest Reduction
Principal Reduction
Term Extension
Short Sale
Deed in Lieu
Payment Plan Arrangement
Restructure
Foreclosure/Liquidation
Refinance
ARM Terms
Points (for origination actions)
Other Actions Of course it should be noted that the above listing is not inclusive and that there are many other possible actions that could be used in a decision model 200 or that could be optimized. The subject matter described herein combines various levels of each action with other actions and constructs "Treatments" that are subsequently optimized upon.

Figure 5:
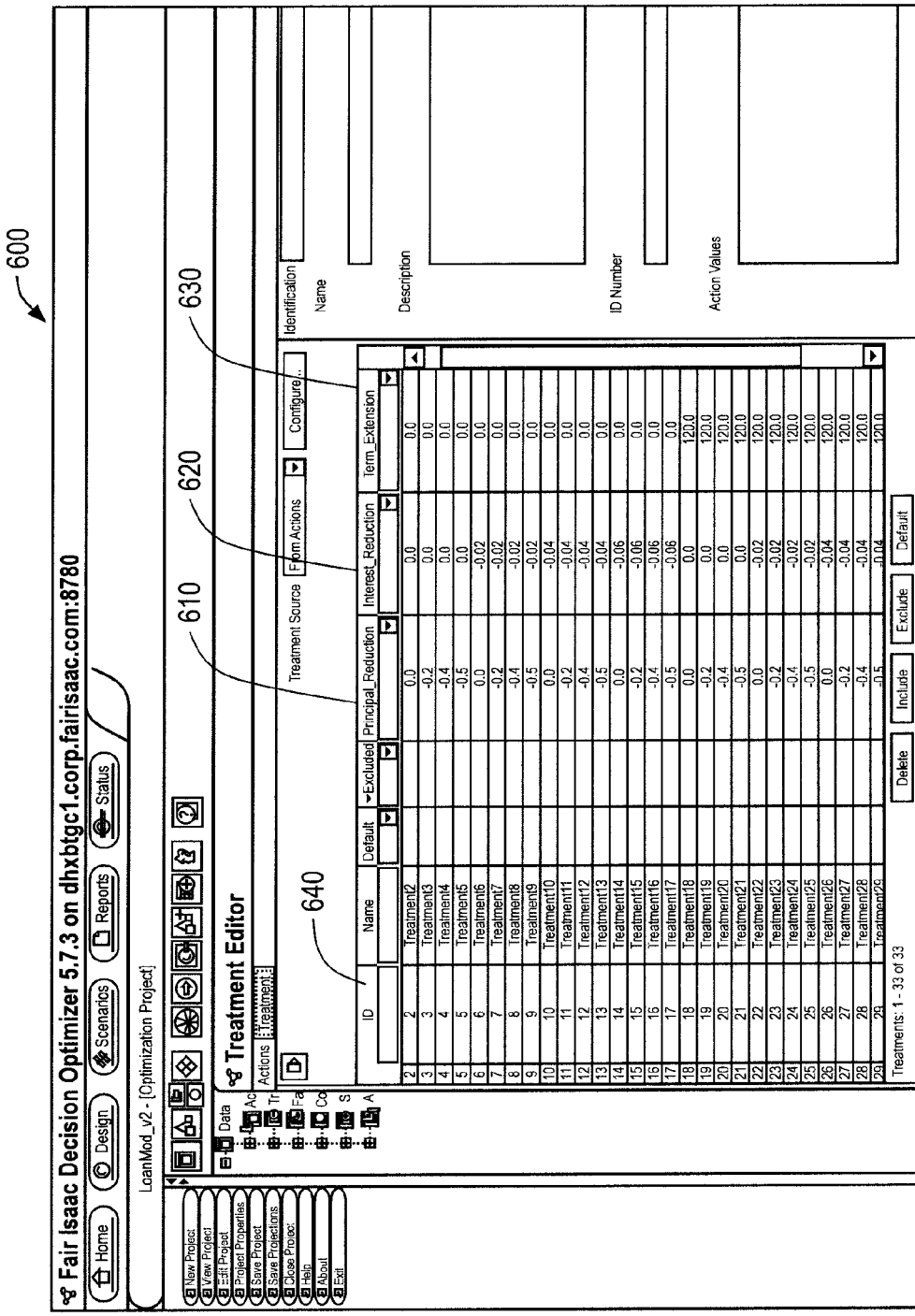
FIG. 5 is a screen shot associated with a list of loan modification treatments.

FIG. 5 shows a screen shot of a treatment editor 600 for deriving treatments in a case when only three actions are considered: Principal Reduction 610, Term Extension 620 and Interest Rate Reduction 630. As shown in FIG. 5, various combinations of parameters for treatments are determined. Each combination of different parameters (namely different values for principal reduction, interest reduction, and term extension) is given a unique ID 640.

Figure 6:
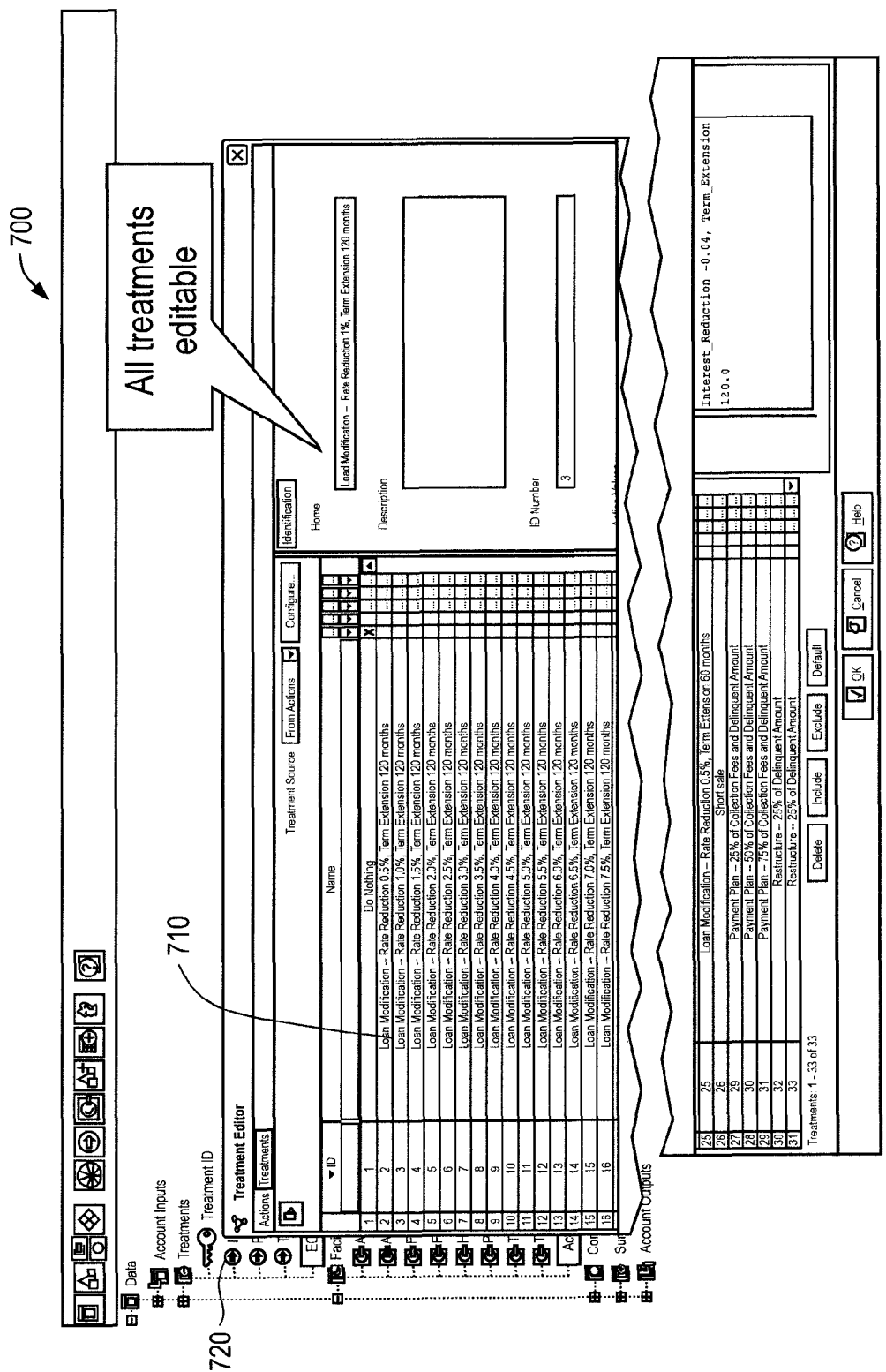
FIG. 6 is another screen shot associated with a treatment editor for deriving treatments.

FIG. 6 shows another screen shot a treatment editor 700 for deriving treatments. As shown in FIG. 6, other treatments 710 may also be run and determined. In addition, various aspects of the treatment are editable to derive additional treatments. Also shown is a file system where different types of treatments 720 can be stored.

Prediction Models

Prediction models are statistical models that estimate a value related to the outcome of a dependent variable (e.g., probability of being able to pay, probability of prepayment, probability of default, etc) from independent variables. If the independent variables include also actions we call the prediction model an action based prediction model.

The predictive models can be "global": i.e., built on the entire portfolio or "segmented" models: i.e., build on segments that are subsets of the mortgage account portfolios.

The subject matter described herein contemplates the usage of any segmentation technology to identify the segments, including but not limited to discriminant analysis, classification and regression techniques, and clustering. As soon as a segmentation scheme is defined on the mortgage portfolio or mortgages, the subject matter described herein employs predictive modeling techniques to build the data driven models that are building blocks in the Decision Model. Example of such predictive modeling techniques are multivariate regression, logistic regression, multinomial regression, support vector machines, neural networks. Rather than describe these techniques further here, the reader is referred to the academic literature where these are discussed at length. The predictive modeling can also be accomplished using a Fair Isaac proprietary modeling technology called Model Builder Scorecard Module.

Prediction models are built using technologies described above. Some of these prediction models involve using decision keys as independent variables and various quantities or metrics of interest as dependent variable. Others involve both decision keys and actions to develop action based prediction models.

The rest of this section gives two simplified examples of action based prediction models.

Example 1

Estimating Probability of being Able to Pay

The treatments derived from the actions under consideration will deterministically change the monthly payment of a mortgage holder:

monthly payment=$f$(outstanding principal*(1−principal reduction), interest rate−interest rate reduction, residual term+term extension)

By combining future monthly payment and income one can calculate affordability defined as:

affordability ratio=($a$*Income−monthly payment)/monthly payment where a is a percentage (e.g., 38%)

The direct interaction variable is Affordability Ratio (instead of the actions themselves).

Figure 7:
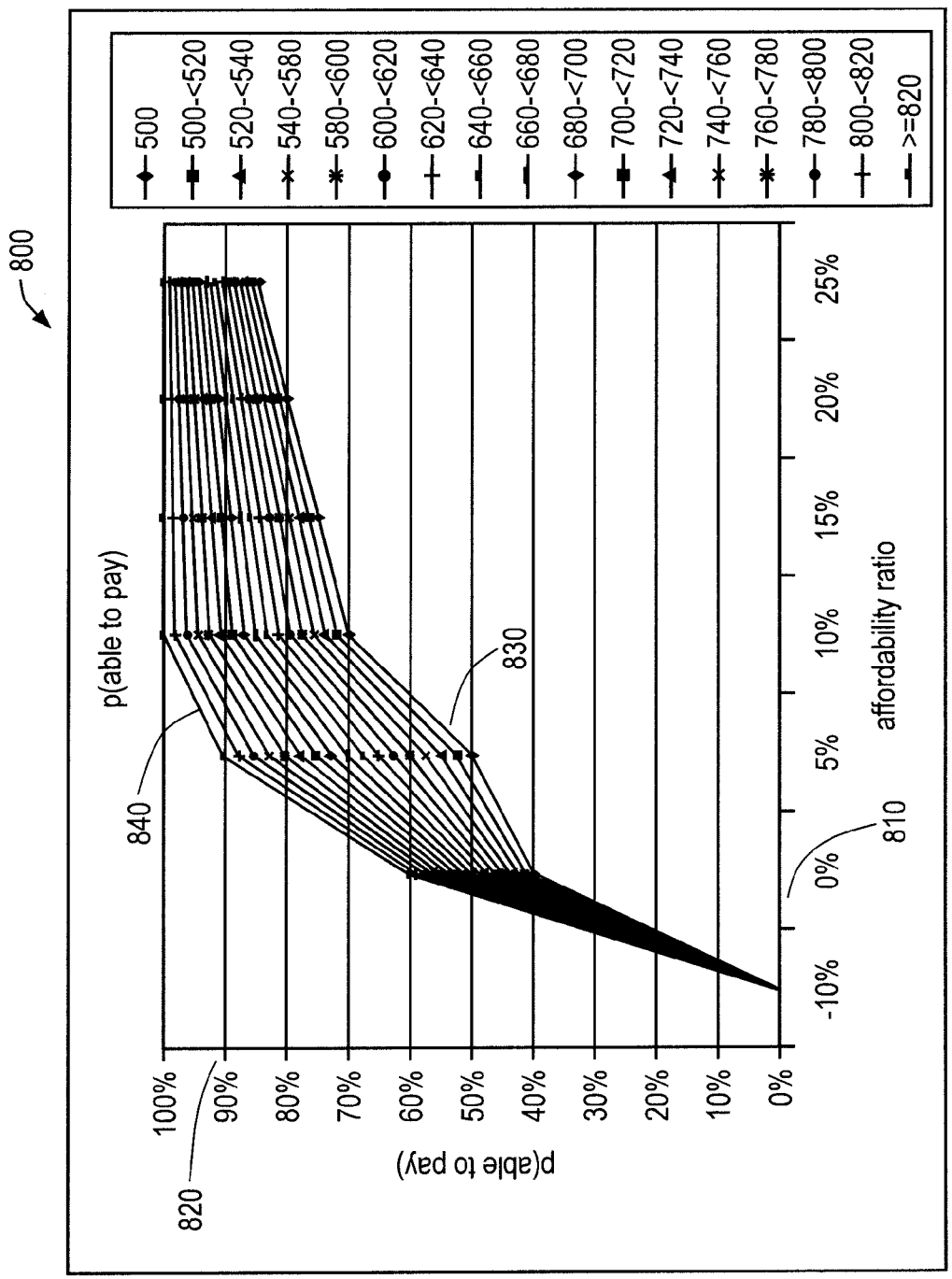
FIG. 7 is a graph showing the probability of the ability to pay at different levels of affordability ratio.

FIG. 7 is a graph 800 of the probability of paying off the mortgage. The graph 800 includes a first axis (x axis) 810 that depict the affordability ratio expressed a percentage. The second axis (y axis) 820 is the probability associated with the ability to pay expressed as a percentage. There are separate plots based on a borrower's credit score, such as the FICO score available from FICO of Minneapolis, Minn. As shown to the right of the graph 800, there is a key for the ranges of the credit scores. There is a plot associated with each range, showing that the dependency of the outcome (ability to pay) on the affordability ratio is different, depending on the value of the FICO Score. For example, there is a plot 830 for credit scores at 500 or below and another plot 840 on the high end for credit scores of 820 or above.

For the same FICO score band, higher affordability=higher p(able to pay).

For the same affordability, higher FICO score=higher p(able to pay). This is a simplified example that shows dependency of an outcome of interest: probability of being able to pay on three actions (implicitly through the affordability ratio) and one decision key: FICO Score. In general such a figure and analysis can be obtained from "integrating out" the influence of all the other decision keys other than FICO Score in an action based predictor model.

Example 2

Estimating Willingness to Pay (Probability of a Walk Away)

The actions employed can change the loan amount. By comparing future home value (estimated) and loan amount one can make inferences about the willingness to pay. In the FIG. 8 the direct interaction variable is future Loan to Value Ratio (implicitly determined from the actions).

Figure 8:
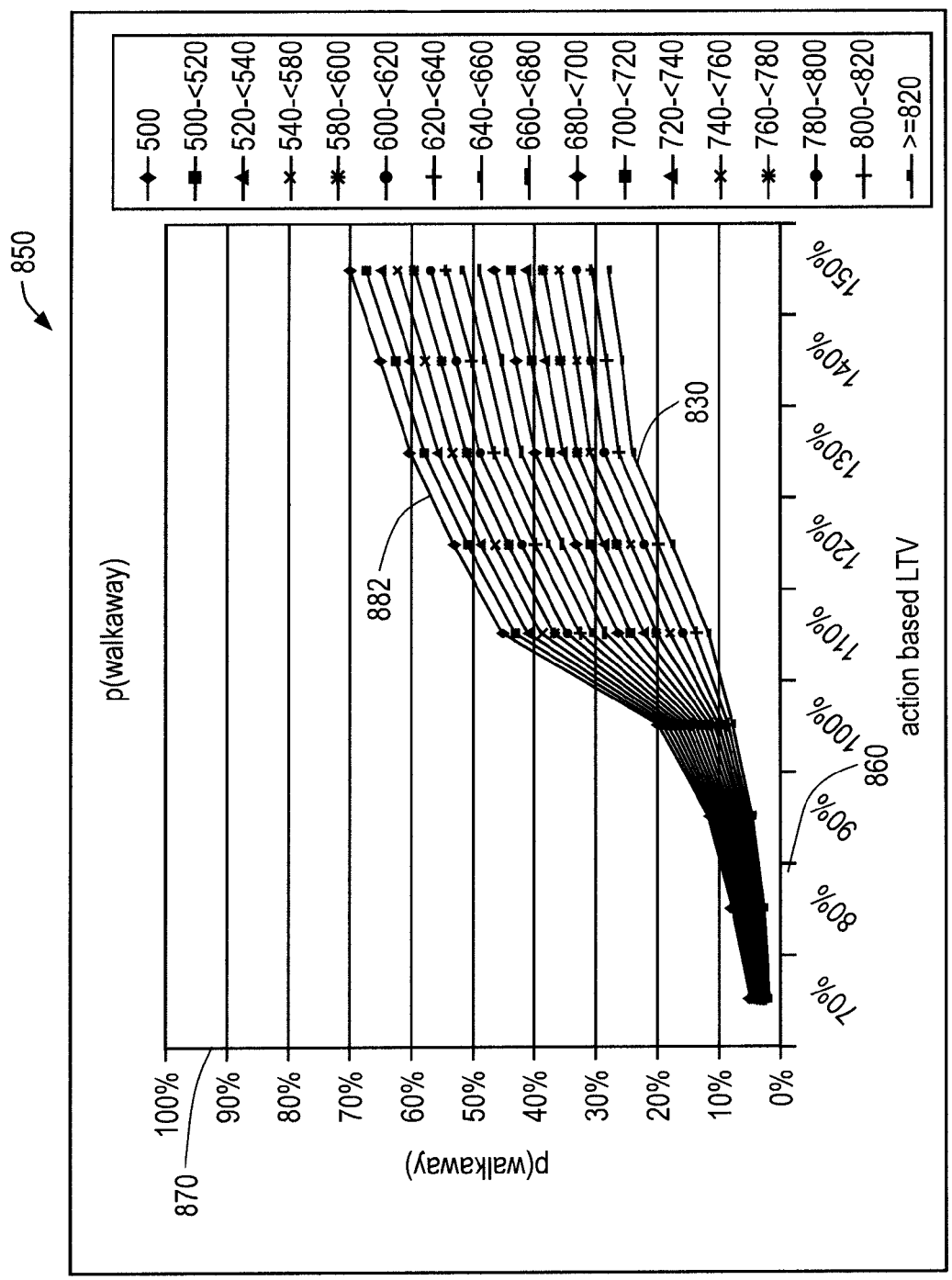
FIG. 8 is a graph showing the probability of a walkaway at different levels of LTV (loan-to-value) ratios.

FIG. 8 is a graph 850 of the probability of the borrower "walking away" from the mortgage. The graph 850 includes a first axis (x axis) 860 that depicts an action based metric: Loan To Value (LTV) expressed as a percentage. The second axis (y axis) 870 is the probability associated with the likelihood to walk away expressed as a percentage. There are separate plots based on a borrower's credit score, such as the FICO score available from FICO of Minneapolis, Minn. As shown to the right of the graph 850, there is a key for the ranges of the credit scores. There is a plot associated with each range, showing that the dependency of the outcome (ability to pay) on the affordability ratio is different, depending on the value of the FICO Score. For example, there is a plot 880 for credit scores at 500 or below and another plot 882 on the high end for credit scores of 820 or above.

FIG. 8 depicts dependencies of the probability to walk away on Loan to Value (LTV) Ratio, segmented by FICO score. One can infer from FIG. 8 that mortgage holders with higher FICO score are less likely to walk away while accounts with higher LTV are more likely to walk away.

As was the case for the first example, this is a simplified example that shows dependency of different outcome of interest: probability of walking away on actions (implicitly through the LTV) and one decision key: FICO Score. Such a figure can be obtained from "integrating out" the influence of all the other decision keys other than FICO Score in an action based predictor model. Of course, this is merely an example. The subject matter described herein contemplates other applications used on any model that depends on decision keys and any actions and model predicting any outcome.

6) Metrics, Objective Functions and Constraints

Various metrics of interest can be modeled, depending on the specific interest and data available for the mortgage portfolio manager. These metrics can be used as intermediate outcomes, objective functions, local or global constraints (e.g., the same metric can be used as an objective function in the optimization in one scenario and as a global constraint in a different scenario).

Figure 9:
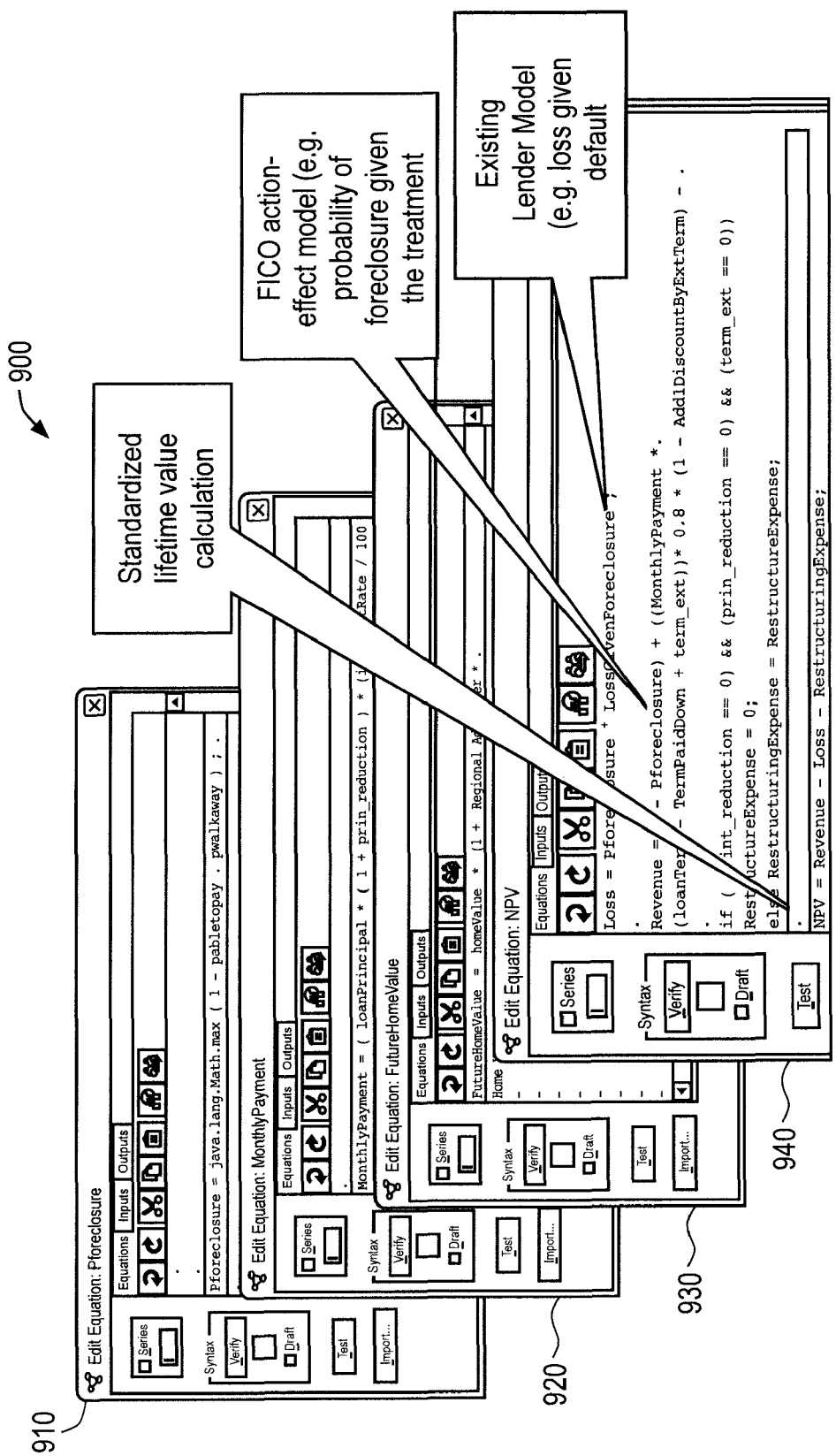
FIG. 9 is a screen shot depicting how various metrics are coded in an overall framework of a decision model.

FIG. 9 depicts how various metrics are implemented in the overall framework of the Decision Model. FIG. 9 shows four screen shots 910, 920, 930, 940 with equations and corresponding to the logic of the calculations for various metrics of interest. For example one of the screen-shots 940 shows a Standardized lifetime value calculation for a mortgage, an action based predictor model (action effect model) built as a component of the subject matter described herein and a lender model (model built by the lender) that are part of the network of models forming the decision model. Another screen shot 930 depicts the equations and corresponding logic of the calculations for predicting the future value of a home, which corresponds to one of the predictive models 220 depicted within the decision model 200 (see FIG. 2).

Listed below in a mathematical format are three equations. These are listed here as examples. They will be described as formulas that are used to implement the Decision Model. The parameters include expert rounding of coefficients provided either by experts or by using data for calibration.

Example 1

Monthly Payment

By paying a monthly payment of a, the loan will be paid off at the end of the term. For a loan with term of n months, fixed periodic (monthly) loan rate r, and loan amount $l_0$, the monthly payment a is:

$$a = \frac{l_0 r}{\left[1 - \frac{1}{(1+r)^n}\right]}$$

The implemented code of original monthly payment and the new monthly payment after loan modification are both based on this formula, with some adjustment. The following displays code used in an actual implementation of the subject matter described herein.

Code for Example 1, Monthly Payment

```
// Original monthly payment before modification
    if (1 – (1 + interestRate/12)^(–(loanTerm –TermPaidDown)) == 0 )
    then OriginalMonthlyPayment = 0;
    else OriginalMonthlyPayment = (loanPrincipal * interestRate/12)
        / (1 – (1 +
            interestRate/12)^(–(loanTerm –TermPaidDown)));
    end-if
// New monthly payment after modification
    MonthlyInterestRate = (interestRate + int_reduction)/12;
    TermMonthsLeft = loanTerm – TermPaidDown + term_ext;
    if (1 – (1 + MonthlyInterestRate)^(–TermMonthsLeft) == 0 )
    then MonthlyPayment = 0;
    else MonthlyPayment = (TotalCurrentPrincipal + CollectionCost) *
MonthlyInterestRate / (1 – (1 +
MonthlyInterestRate)^(–TermMonthsLeft));
    end-if
// override monthly payment for certain treatments
    if ( short_sale == 1 or
        deed_in_lieu == 1 or
        restructure_100 == 1 or
        restructure_50 == 1 or
        extension_6mos == 1)
    then
        MonthlyPayment = 0;
```

Example 2

Balance at Period i

Balance $b_i$ at the end of period i includes the outstanding principal at the beginning of period i and the interest charged for the outstanding capital for period i. The balance due at the end of period i is given by:

$$b_i = \frac{l_0[(1+r)^{n+1} - (1+r)^i]}{(1+r)^n - 1}.$$

Example 3

Net Present Value of Profit

The present value of profit is the difference between the present values of revenue and loss.

The present value of profit for an account paying to maturity is $$g_A = \sum_{k=1}^{n} \frac{a}{(1+d)^k} - l_0,$$

where n is the loan term, a is the monthly payment, $l_0$ is the loan amount, and d is the discount factor.

The present value of profit for an account defaulting at period i is $$g_{Di} = \sum_{k=1}^{i-1} \frac{a}{(1+d)^k} + \frac{\zeta b_i}{(1+d)^i} = l_0,$$

where $b_i$ is the remaining balance at period i, and $\zeta$ is the recovery rate.

The implemented code of NPV displayed below is a simplified demonstration which considers the performance in a single period only, with adjustment of different actions.

Code for Example 3, Net Present Value of Profit, Considering a Single Period, with Adjustment of Actions

```
//Revenue
    if ( ( ( short_sale = 1 ) or ( deed_in_lieu = 1 ) ) and (
loanPrincipal <= FutureHomeValue ) ) then
        Revenue = FutureHomeValue – loanPrincipal
    else if ( ( short_sale = 1 ) or ( deed_in_lieu = 1 ) ) then
        Revenue = 0
    else if ( ( restructure_100 = 1 ) or ( restructure_50 = 1 ) ) then
        Revenue = ( 1 – Pforeclosure * 0.9 ) *
( MonthlyPayment * ( 60 + 1.3 * ( loanTerm – TermPaidDown +
termExtension – 60 ) ) * 0.85 * ( 1 – AddlDiscountByExtTerm ) –
loanPrincipal )
    else if ( extension_6mos = 1 ) then
        Revenue = ( 1 – Pforeclosure * 0.8 ) *
( MonthlyPayment * ( 60 + 1.3 * ( loanTerm – TermPaidDown +
termExtension – 60 ) ) * 0.85 * ( 1 – AddlDiscountByExtTerm ) –
loanPrincipal )
    else
        Revenue = ( 1 – Pforeclosure ) *
( MonthlyPayment * ( 60 + 1.3 * ( loanTerm – TermPaidDown +
termExtension – 60 ) ) * 0.85 * ( 1 – AddlDiscountByExtTerm ) –
loanPrincipal )
    end-if
//Loss
    if ( short_sale = 1 ) then
        Loss = LossGivenShortSale
    else if ( deed_in_lieu ) then
        Loss = LossGivenDeedInLieu
    else if ( restructure_50 = 1 or restructure_100 = 1 ) then
        Loss = Pforeclosure * 0.9 * LossGivenForeclosure +
LossGivenRestructure
    else if ( extension_6mos = 1 ) then
        Loss = Pforeclosure * 0.8 * LossGivenForeclosure
    else
```

```
        Loss = Pforeclosure * LossGivenForeclosure
    end-if
//NPV
    NPV = Revenue − Loss − RestructuringExpense
```

Traditionally, the field of decision analysis has dealt with models where constraints do not appear in an explicit form. Constrained optimization belonged almost exclusively to the field of mathematical programming, where problems have been modeled deterministically and decisions as one stage. The need and benefits of including constraints, particularly in portfolio management problems has led to the development of a framework to allow strategy optimization subject to a variety of explicit constraints.

Two types of constraints become important:

Portfolio-level constraints: these allow for a unique way to address conflicting business objectives in a decision problem. Examples of portfolio level or global constraints are:
- % of accounts receiving any loan modification
- % of accounts receiving term extension
- % of accounts receiving interest reduction
- % of accounts receiving principal reduction
- Total $ of principal reduction
- Total $ Loss
- % of accounts foreclosed
- % of outstanding loan amount foreclosed Account level constraints: these may be needed to satisfy business and operational requirements and to create consistency of account treatment across accounts. Examples of account level or local constraints are
- FICO score
- Current loan amount
- Current LTV 7) Optimization After a complete Decision Model is built the next step is to employ Optimization to derive optimal decisions for each of the mortgage accounts that are collectively defining the mortgage portfolio.

Figure 10:
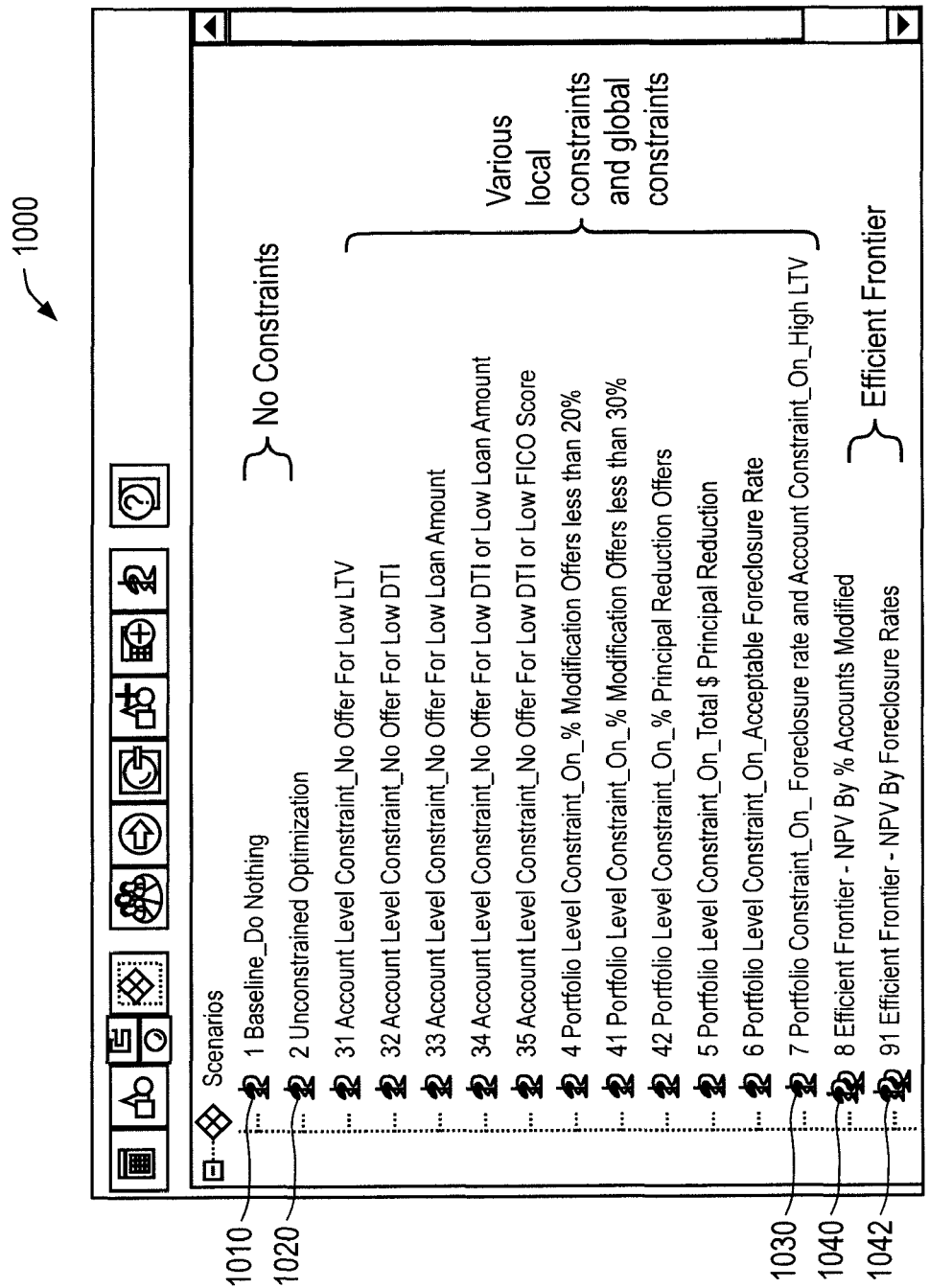
FIG. 10 is a screen shot showing an outline of various constrained and unconstrained optimization scenarios.

First a scenario is defined: i.e., an objective function and the local and global constraints that need to be applied to this scenario. FIG. 10 shows examples of such scenarios. FIG. 10 is a screen shot 1000 that depicts a variety of scenarios run in the process of determining the preferred strategy for the mortgage portfolio under management. For example, there is a Baseline scenario 1010 involving no further action taken on the portfolio. There is also an optimized scenario 1020 where no constraints were applied to the optimization process (Unconstrained Optimization). There are also eleven optimized scenarios, one of which carries reference number 1030, with local and global constraints. Also included are two Efficient Frontier scenarios 1040 and 1042. A Mortgage Portfolio Manager can set up these various scenarios and run these scenarios. It should be noted that the listing shown is merely a sample of a few scenarios that could be set up and run. After running the scenarios, the Mortgage Portfolio Manager reviews and contemplates the results, and then selects a final optimized scenario that satisfies all the business and operational constraints.

Figure 11:
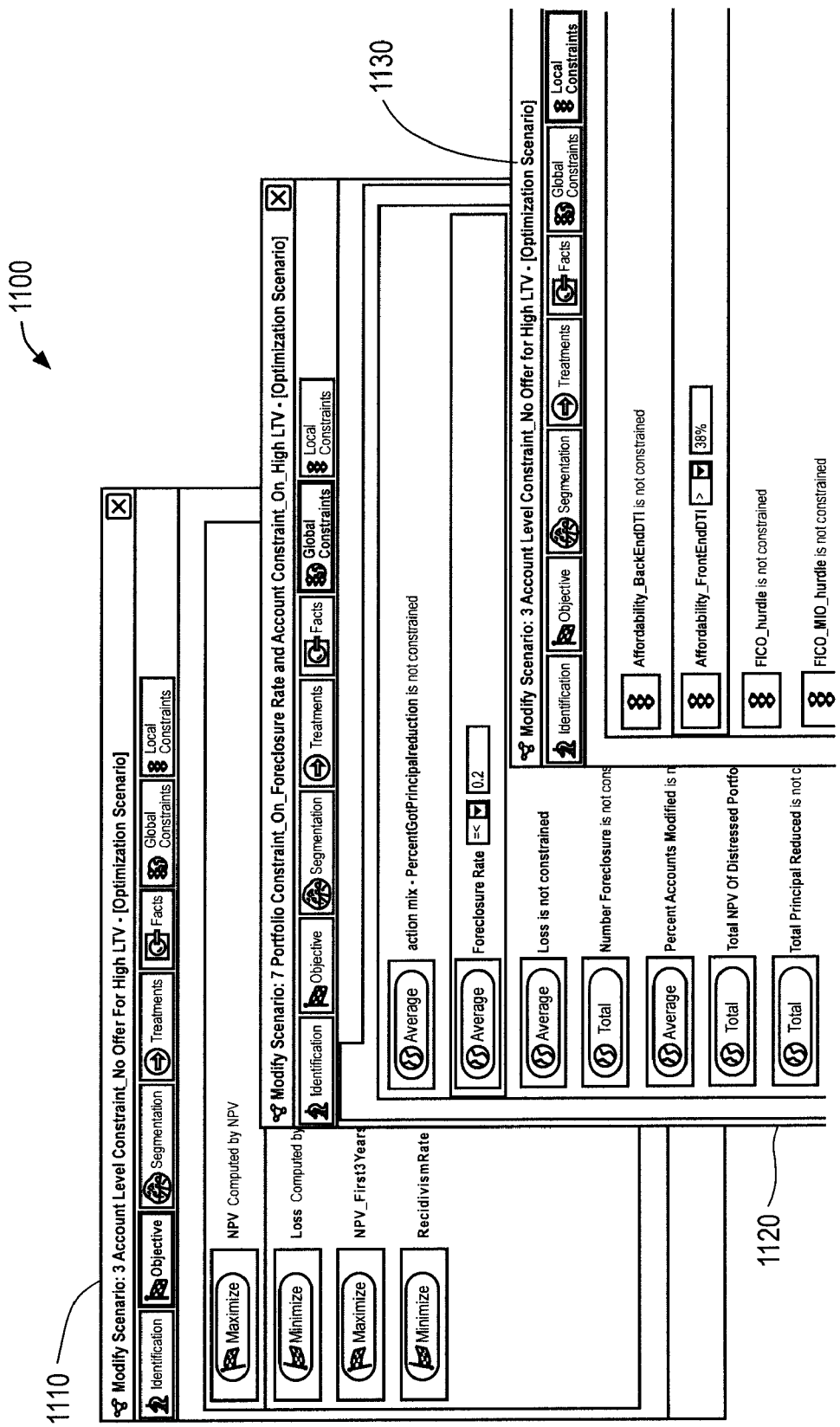
FIG. 11 is another screen shot associated with optimization components showing an interface for modifying constraints for various optimization scenarios.

In selecting the settings for a given scenario of FIG. 10, the mortgage portfolio manager will consider various mixes of treatments, objectives and constraints as shown in FIG. 11. More specifically, FIG. 11 shows three screenshots 1110, 1120, 1130 that present selectable options to a user, such as a Mortgage Portfolio Manager. A screenshot is one presentation associated with a graphical user interface associated with the subject matter described herein. Screenshot 1110 presents four objective functions from which one is selected. In screenshot 1110, the objective function (NPV) of the optimization is chosen or selected as depicted by the highlighting. Screenshot 1120 presents seven possible global constraints. As shown, the global constraint of "Portfolio Foreclosure Rate" is chosen from a set of seven global constraints as depicted by the highlighting. Screenshot 1130 presents four local constraints. As shown the local constraint of "Affordability based on Front End Debt to Income Ratio" is chosen from a set of four local constraints as depicted by the highlighting shown.

Then optimization is run. The output of this optimization is an optimal decision assigned to each account in the mortgage portfolio.

Mathematically the problem is transformed in a linear or non linear programming task and any optimization algorithm that is designed to solve this type of problems can be applied. It should be noted that the subject matter described herein applies to: linear and non linear programming, integer programming, Newton Rapson, gradient based algorithms, convex optimization problems and the like.

Given that the size of the problem (number of accounts and total number of treatments) can become very large, scalable optimization might need to be employed. The subject matter described herein makes use in such cases of a Scalable Optimization Algorithm that was developed at FICO. A description of an optimization algorithm can be found in USPTO Patent Application Pub. NO. 20060020564, Method and apparatus for a scalable algorithm for decision optimization, the contents of which are hereby incorporated by reference.

The interested reader is advised to look to the above referenced patent application for full disclosure of the scalable algorithm.

8) Sensitivity Analysis

In some implementations of the subject matter described herein, sensitivity analysis can be performed.

Sensitivity analysis has two main roles:

Obtaining a satisfactory decision model through an iterative process of model modification and analysis; and Evaluating the sensitivity of the optimal strategies to parameters in the problem about which the decision maker is uncertain.

One-way sensitivity analysis refers to testing the effect of varying the value of a single parameter (such as a key probability, etc.) on the objecfive(s) and the optimal strategy. The model is solved repeatedly for different values of the parameter within a specified range, and the effects on both the objective(s) and the optimal strategy are recorded.

Figure 12:
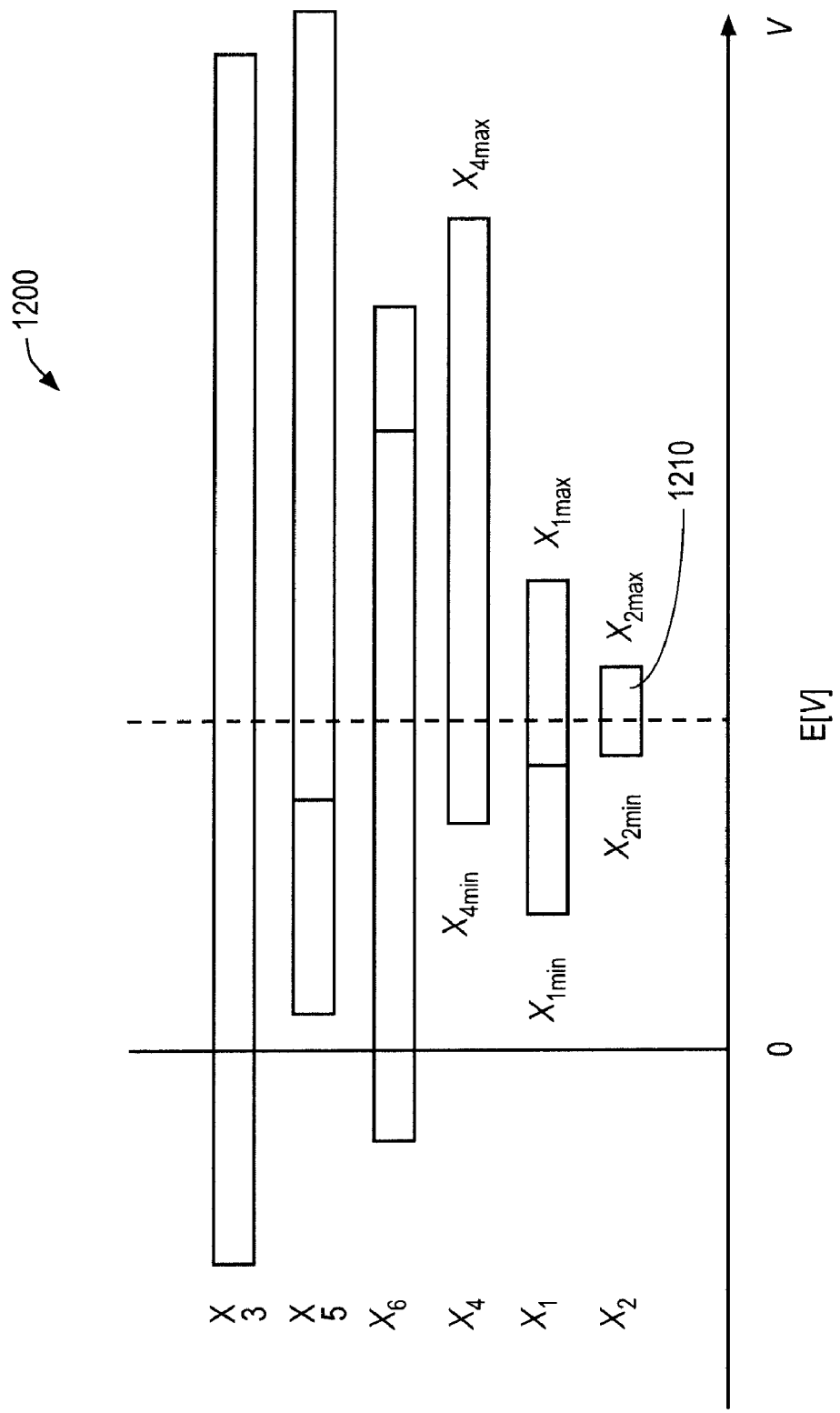
FIG. 12 is a graph showing a sensitivity analysis plot for testing the sensitivity of a set of optimal strategies to parameters.

When one-way sensitivity analysis is repeated for each of a number of variables in the problem, the results can be displayed effectively in the form of a tornado diagram, like the one illustrated in FIG. 12. FIG. 12 is a tornado diagram 1200 where each bar corresponds to a variable (e.g., $X_1$ through $X_6$) and represents the range of change of an objective's value V (e.g., NPV) resulting from that variable's variation in a specified domain between a minimum and a maximum value.

In a tornado diagram each bar corresponds to a variable (e.g., $X_1$ through $X_6$) and represents the range of change of one objective's value (denoted by V in the figure, e.g., NPV) resulting from that variable's variation in a specified domain between minimum and maximum reasonable values (e.g., $x_{1min}$ and $x_{1max}$ for $X_1$). Since the bars are stacked in order of increasing length, one can immediately see which variables matter most (in affecting the objective) and which least. The latter, like $X_2$ may be safely excluded from the model other than a fixed-based value, while the former need to be modeled in detail as one or maybe more chance nodes with appropriate probability distributions in the influence diagram. Special attention needs to be given to changes in color in the bars, which conventionally represent those regions in a variable's domain causing a switch in the optimal strategy (e.g., $X_1$, $X_6$, and $X_5$). Also important are those variables whose variation may cause an unacceptable range of the objective function. For example, if V is NPV in FIG. 12, then variables $X_3$ and $X_6$ may cause losses (negative NPV). The tornado diagram 1200 can be used as a tool for selecting or eliminating variables. For example, changes in the variable $X_2$ results in a small changes in the objective NPV, as shown by the short length of the bar $x_{2min}$-$x_{2max}$, and which carries the reference number 1210. The variable $X_2$ may be a candidate for elimination as a variable in a final decision model.

The entire process may then be repeated until the analyst and the decision maker are satisfied with the final model.

The second important role of sensitivity analysis is achieved through varying two or more key parameters concurrently. Referred to as multi-way sensitivity analysis, this allows for capturing subtle interactions among parameters and is visually depicted (for up to three-way analysis) in a strategy space. Different regions in the strategy space correspond to different optimal strategies. The strategy space is a useful tool not only to confirm model robustness, but in getting valuable insight as to why the optimal strategy structure makes sense.

9) Analyze: Business & Analytic Reporting

Optimization runs corresponding to different optimization scenarios are completed and the optimization results are comprehensively scrutinized through a series of analytic and business reports.

Figure 13:
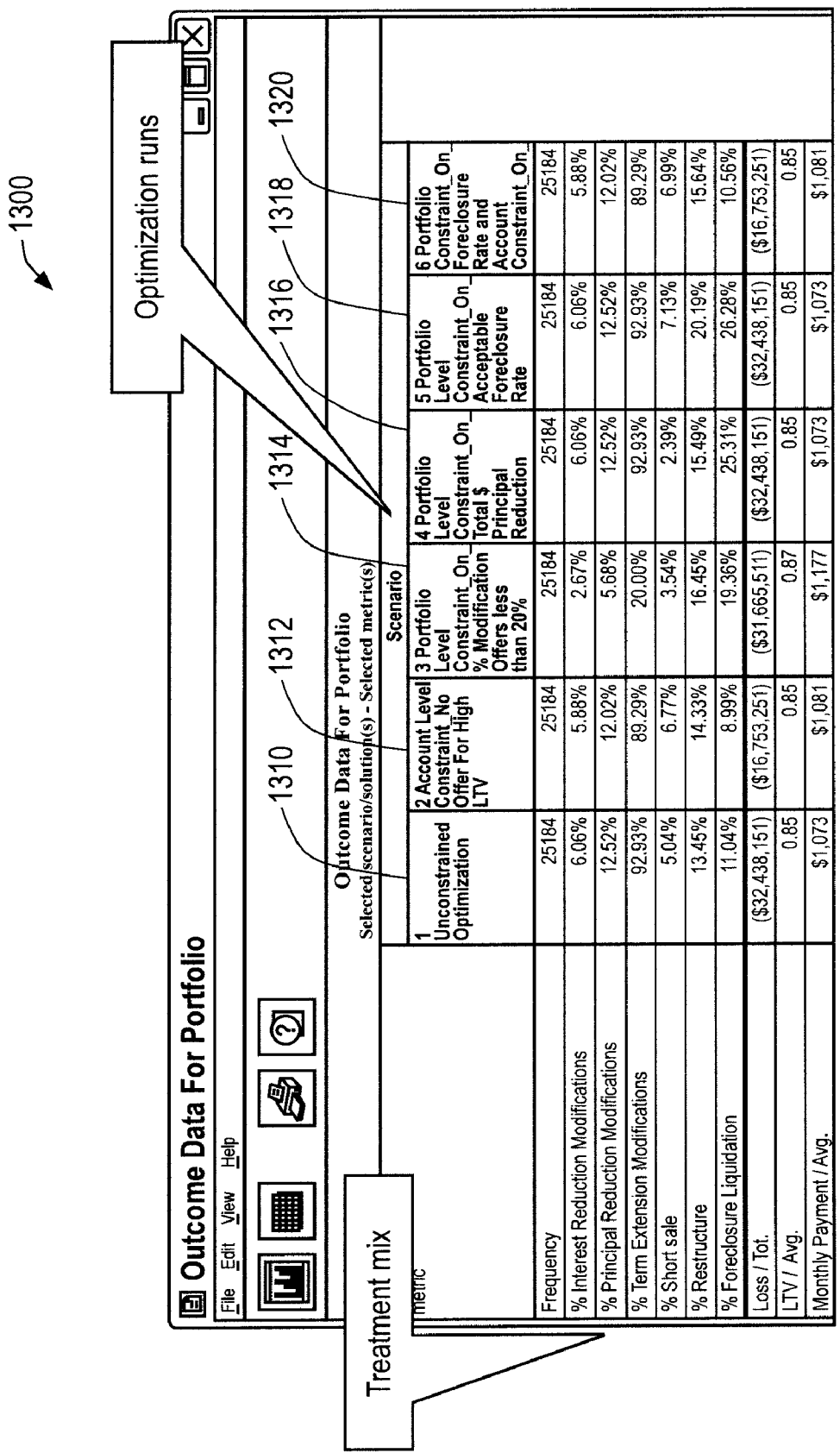
FIG. 13 is a screen shot showing various treatment mix scenarios and related values associated with metrics of interest that correspond to a selected number of constrained and unconstrained optimization runs, according to an example implementation.

FIG. 13 shows treatment mix scenarios and the values of some of the metrics of interest corresponding to a number of constrained and unconstrained optimization runs. FIG. 13 is a screenshot 1300 of a report depicting six optimization runs 1310, 1312, 1314, 1316, 1318, 1320. One of the optimization runs 1310 is an unconstrained optimization. The other five optimization runs 1312, 1314, 1316, 1318, 1320 are constrained. The columns associated with each of the optimization runs 1310, 1312, 1314, 1316, 1318, 1320 show details as to how the treatment mix is distributed for each of these optimization runs and what are the values of some of the key metrics for each of these optimization runs.

Figure 14:
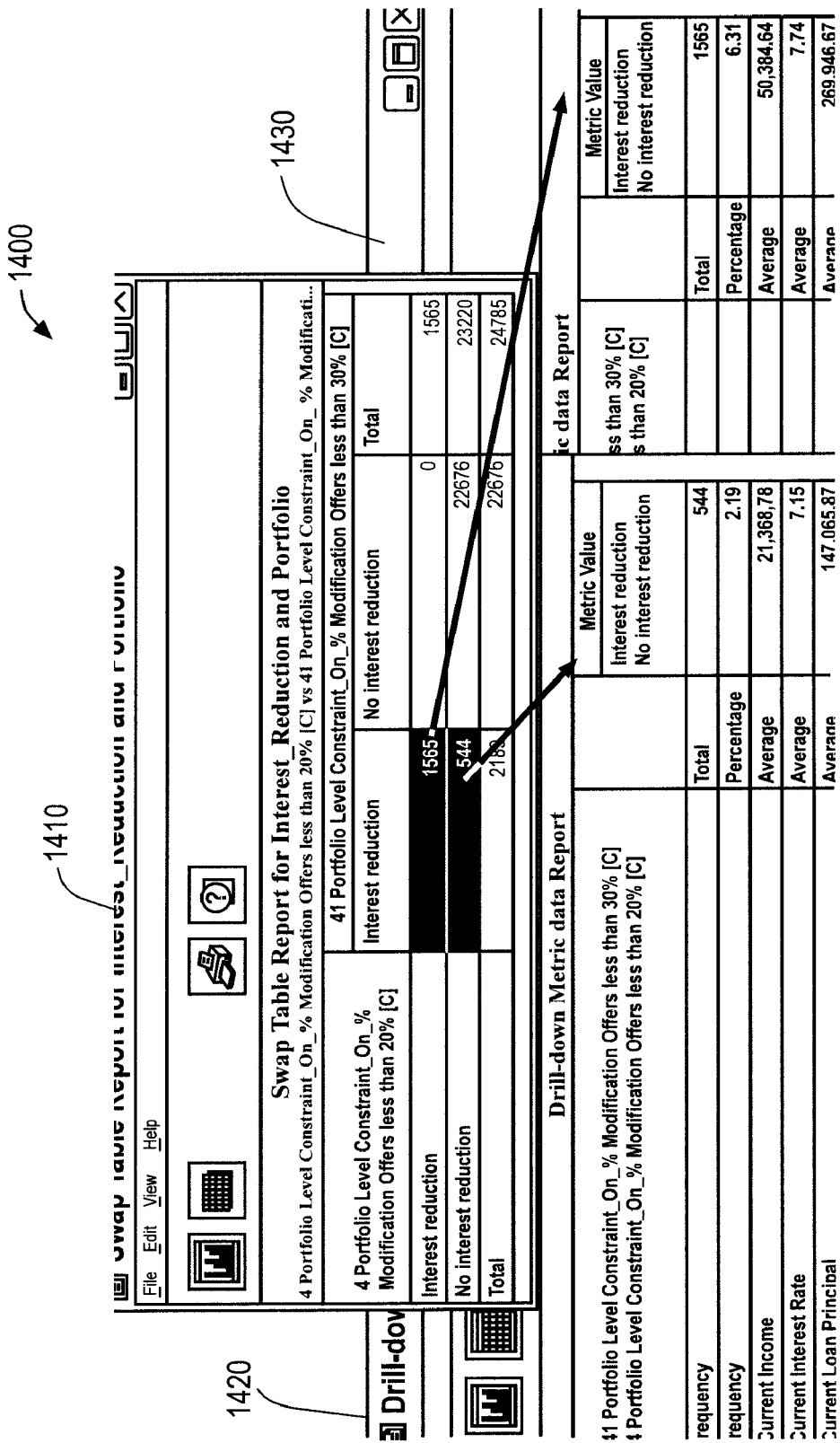
FIG. 14 is a screen shot showing a comparison of different optimization runs having global constraints.

Different runs with global constraints are compared in order to converge on the preferred situation that will be implemented as the optimized policy for the mortgage portfolio as shown in FIG. 14. More specifically, FIG. 14 is a screen shot 1400 of a swap set report. The frame portion 1410 shows a swap set report between two constrained optimization scenarios. The frame portions 1420, 1430 depict drill downs into various metrics corresponding to each cell in the swap set table.

Figure 15:
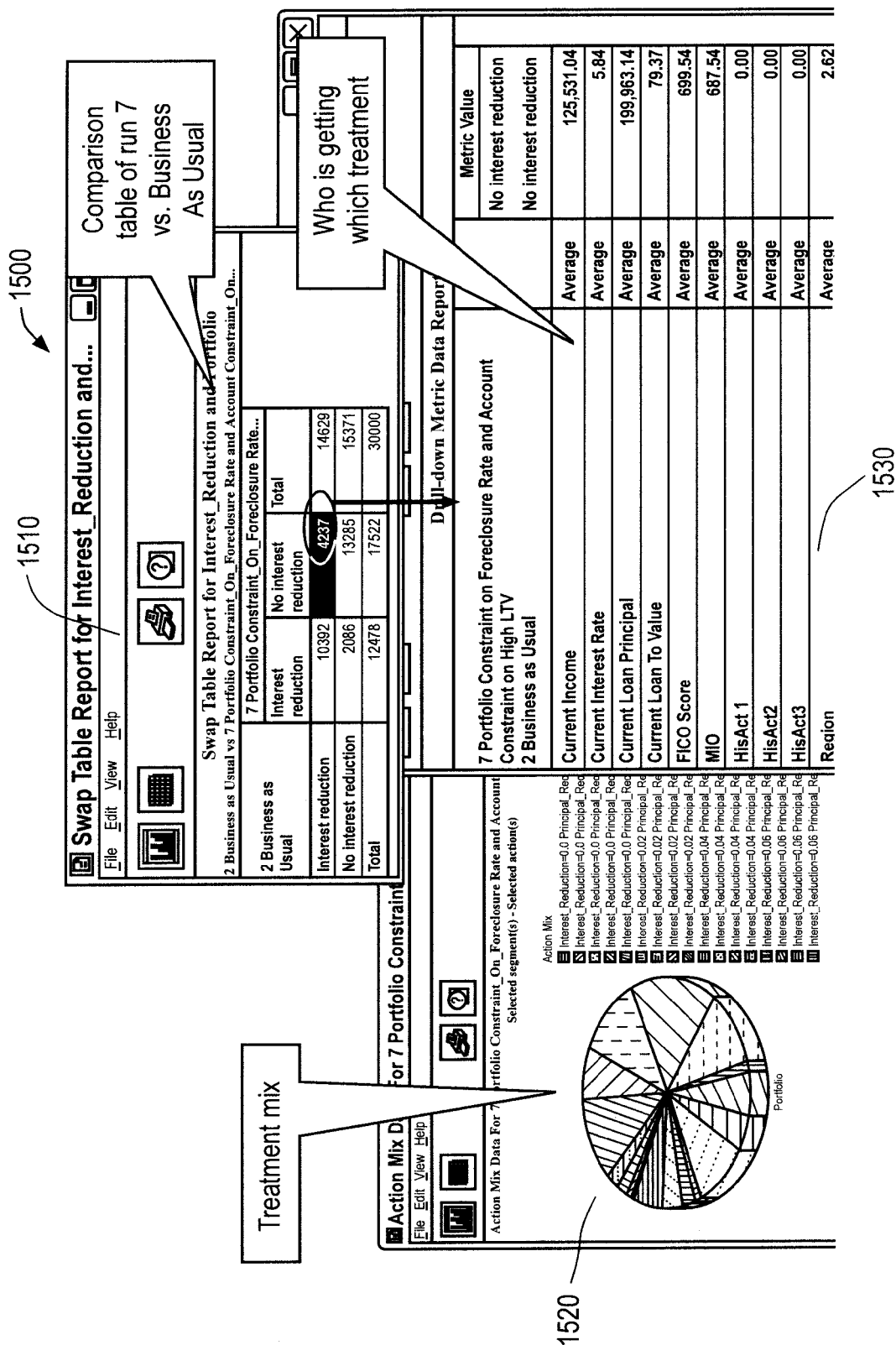
FIG. 15 is a screen shot showing the assignment of example treatments associated with a particular scenario and a profiling analysis on the features of the loans that got a specific type of treatment assigned.

One can also drill in to understand how the optimal treatments corresponding to each scenario are assigned. This is shown in FIG. 15. FIG. 15 is a screen shot 1500 showing a comparison table 1510, a treatment mix 1520 and a drill down 1530. The comparison table 1510 shows a comparison between a constrained optimization scenario and a baseline. The treatment mix 1520 is a pie chart depicting how the treatments are assigned. The drill down 1530 displays the profile of the mortgage accounts from a given segment. The drill down 1530 is typically a cell from the swap table report, such as the swap table report 1410 (see FIG. 14).

10) Efficient Frontier

A simple and very effective way to graphically depict the tradeoffs among objectives is by using efficient frontiers. Given a decision model, a frontier represents, in the space of two or more objectives, the set of the best performing achievable points in that space.

Figure 16:
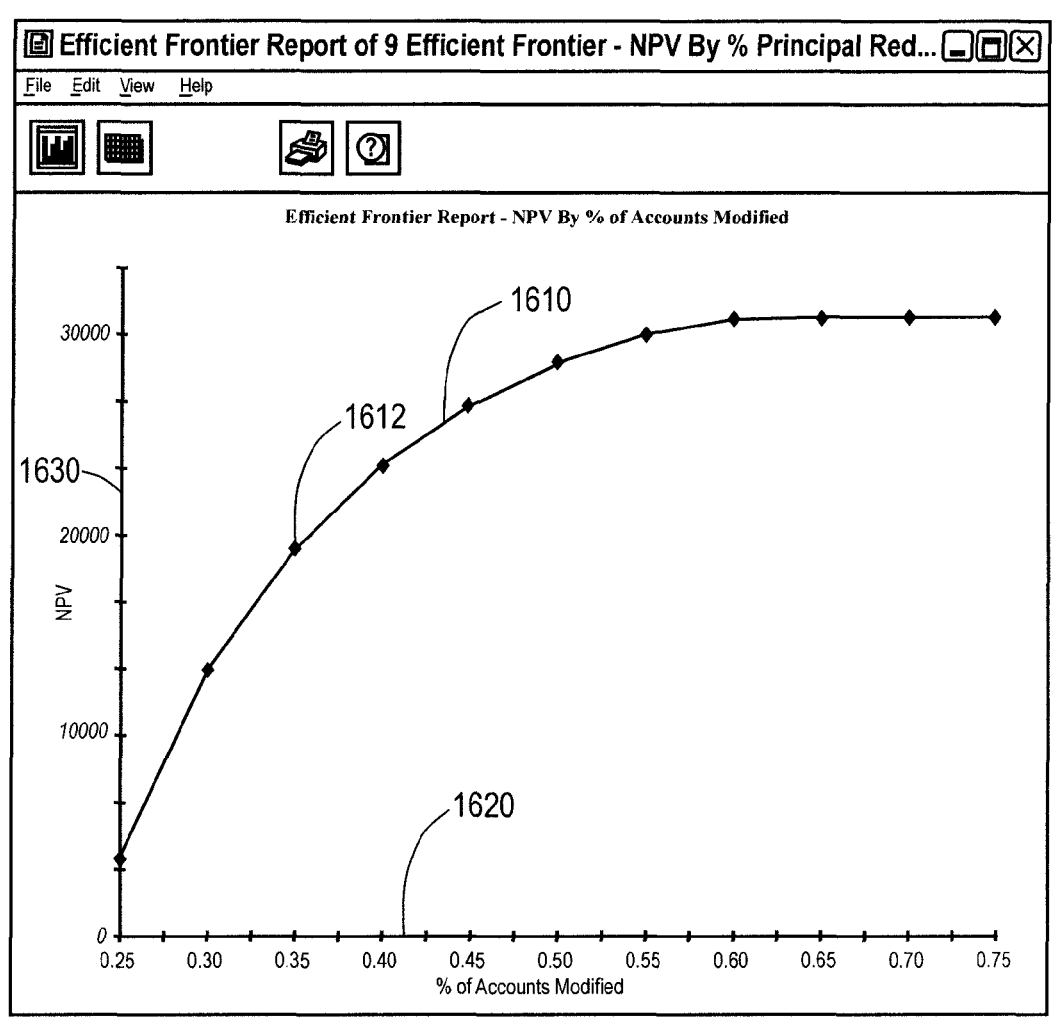
FIG. 16 is a graph displaying an Efficient Frontier that shows how the optimized net present value (NPV) changes with respect to the percentage of loans in a particular portfolio that are modified.

FIG. 16 shows an example of an Efficient Frontier 1600. The Efficient Frontier 1610 is a plot of the percentage of accounts modified vs. the net present value of the portfolio. On the x-axis 1620 is the percentage of the accounts modified. On the y-axis 1630 is the value of Net Present Value, the metric that is being optimized for this particular decision model example. Each point from the efficient frontier 1610 corresponds to an optimized strategy. For example, optimizing the set of actions applied to the given mortgage portfolio, constrained to only allow 35% of all the loans to be modified, corresponds to an average NPV of a little less than $20,000 (see point 1612 in FIG. 16). FIG. 16 shows, for example, that the higher the percentage of mortgage accounts optimally modified, the higher the net present value of the portfolio (within the illustrated range of 0.25 to 0.75).

One can see that there is a diminishing return in increased NPV that appears at around 60% of the loans being allowed to be modified (with optimal treatments).

The choice of the operating point on the efficient frontier should be determined by the decision maker judgmentally, by considering the subjective tradeoff between NPV and the volumes of the modification. In fact, if the portfolio manager can assess his or her tradeoff factor between NPV and Volume, the optimal point on the efficient frontier would be the one where the slope of the tangent line equals the tradeoff value.

Tradeoffs can be incorporated as a way to assign weights of importance to the various objectives. Multi-attribute utility theory provides a framework to assign these weights systematically, such that interactions among objectives, as well as risk attitude, are also taken into account. The decision rule is then to choose the strategy that maximizes the expected multi-attribute utility.

11) Assigning Optimal Actions

Once an optimal operating point is chosen the optimized strategy is crafted for implementation in production. The optimized strategy reflects the convergence of an iterative process and reflects all the business objectives of the portfolio manager as well as satisfies all the operational and business constraints for the mortgage portfolio under consideration.

At this point every single account is tagged with a treatment which is the combination of optimal actions desired.

A classification tree can be built to express exactly what the optimized actions for each account are. To this end, the decision keys will be used as predictors (independent variables in the classification tree) and the optimal treatment that is known at this point will be used as a categorical dependent (response) variable. The number of categories for this variable is equal with the number of treatments that can be found amongst the optimal treatments for the portfolio: i.e., is the set of all the optimal treatments that are assigned to the mortgage accounts that constitute the optimized portfolio. This step is useful because a human expert can easily review the tree and thereby quickly gain an exact understanding of the proposed customer treatments and because such a tree can be easily converted into a rule set for execution by a rules management engine (such as Blaze Advisor available from FICO of Minneapolis, Minn.).

A large unpruned multi-class classification tree is grown all the way until the misclassification error becomes zero. Each terminal node corresponds to a segment. All the accounts falling into this segment will be tagged with the same optimal action, which is the value of the dependent variable (treatment) for this terminal node. By definition all the accounts in a terminal node have the same value for the dependent variable. The profile of the segments obtained as above is determined by the decision keys that constitute the variables that the tree splits on prior to reach the terminal node: in other words the variables that define the path from the root node to the leaf.

Figure 17:
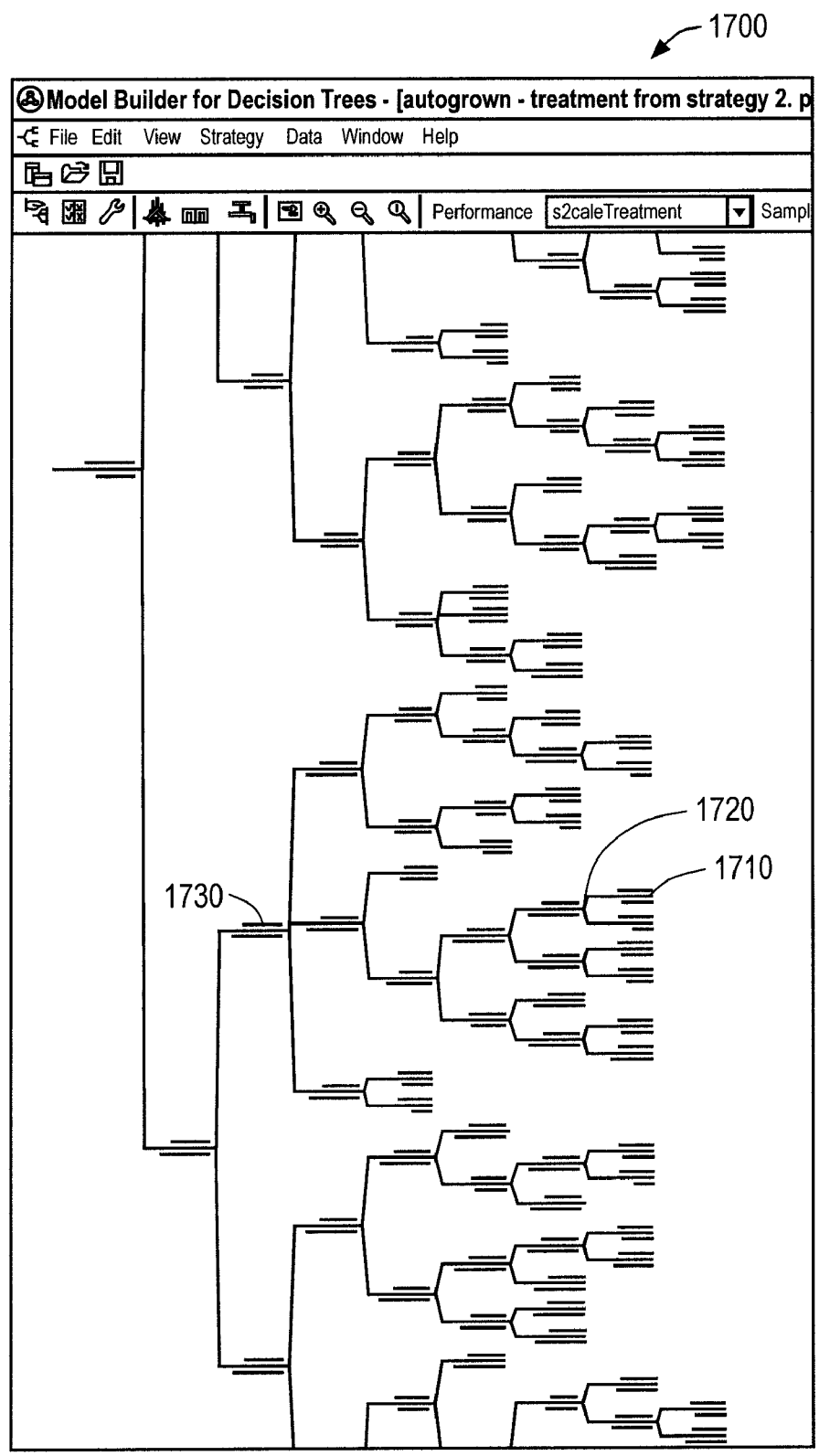
FIG. 17 is a graphical showing of a strategy decision tree.

This tree is usually very large and can have hundreds or thousands of terminal nodes. One such tree is depicted in FIG. 17 as a strategy tree 1700. The terminal nodes, such as node 1710, of this strategy tree 1700 are treatments corresponding to an optimized strategy. The split points, such as split point 1720, of this tree 1700 are decision keys (e.g., FICO Score, current LTV, etc). A branch, such as branch 1730, of the tree 1700 fully describes a segment of the accounts. Each segment receives the treatment displayed in the corresponding leaves, or the terminal node.

The tree in FIG. 17 is a real life example of a tree that corresponds to an optimized strategy defined by an optimization scenario with the following settings:

Objective: maximize NPV of the portfolio
Treatments: combination of principal reduction, interest reduction, and term extension
Global Constraints:
  Loss Ratio<=3.5%;
  Pct. Modified<=50%; A
  Average Principal Reduced<=~$12000
Local Constraints:
  Can only receive loan modification if Loan-To-Value<=1.4

Figure 18:
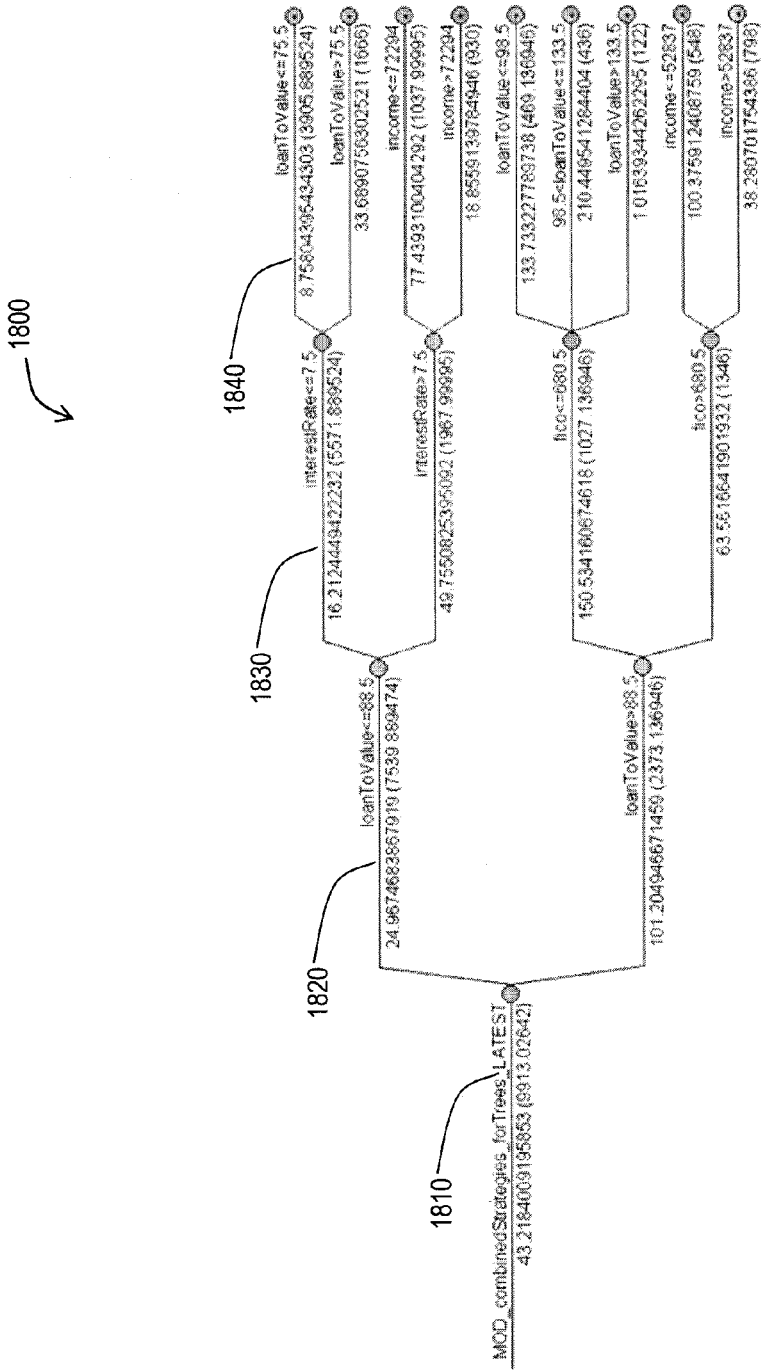
FIG. 18 is showing an example strategy decision tree with four levels of splits in the decision logic.

FIG. 18 is a screen shot representing another strategy tree 1800 and the first four levels 1810, 1820, 1830 and 1840 of the strategy tree. It is provided so that more detail is evident than is displayed in FIG. 17.

The decision keys involved in this pruned tree are: loan to value, current interest rate, income and FICO score.

The large tree of FIG. 17 can be directly implemented in production. Sometimes these large trees are pruned to smaller and easier to interpret trees that constitute the final product implemented in production. This pruning can be done automatically (using pruning algorithms for classification trees), in an expert manner, or as a combination of the automatic and expert strategies. Simulation can be employed to compute all the metrics of interest for a strategy as represented by the pruned tree. If the values of these metrics satisfy all the objectives for the portfolio manager, the tree is put into production.

12) Testing (Learning) Strategies

Sometimes historical data associated with actions historically taken on the portfolio's accounts can be missing in some areas: e.g., historically accounts from a given portfolio of mortgages were not exposed to interest rate reduction greater than 1%.

It is useful to be able to infer what the performance of an account is after an interest reduction of 3% (for example). While predictive models can be very good for data interpolation, extrapolation can be a challenge. In this case either expert judgment or experimentation can be employed to produce data relevant to the given area of interest.

Based on the science of experimental design and on simulations using a decision model, a "learning strategy" (test strategy) collects information-rich test data specifically targeting potentially profitable regions of the operational strategy. The design of the learning strategy is geared towards maximizing the efficiency of testing while minimizing the economic impact.

Figure 19:
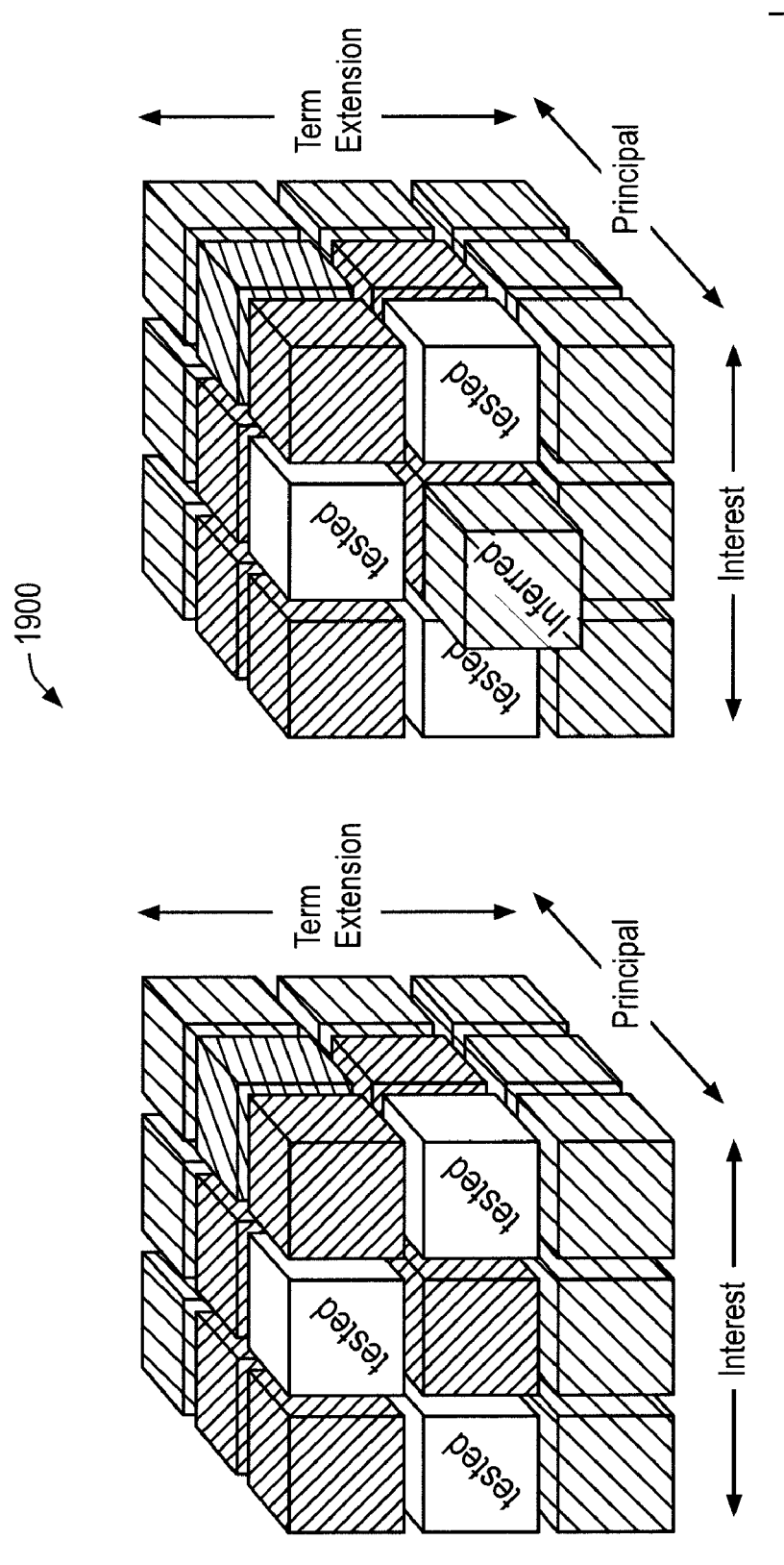
FIG. 19 depicts a conceptual picture of a design for a testing (learning) strategy and how the data collected is used to make inferences.

There are many possible combinations of the actions. The situation gets worse the more actions and levels one considers for testing. The design of the learning strategy distributes the test cells in an intelligent and efficient way such that upfront investments in testing is minimized and accurate predictions can be made for cells that haven't been tested. FIG. 19 depicts a conceptual view of a design for the Learning Strategy. The left picture shows that only a limited set of action combinations are tested while the right picture indicates that using the test data, inferences can be made for untested cells. These inferences are made through the use of predictive models.

Figure 20:
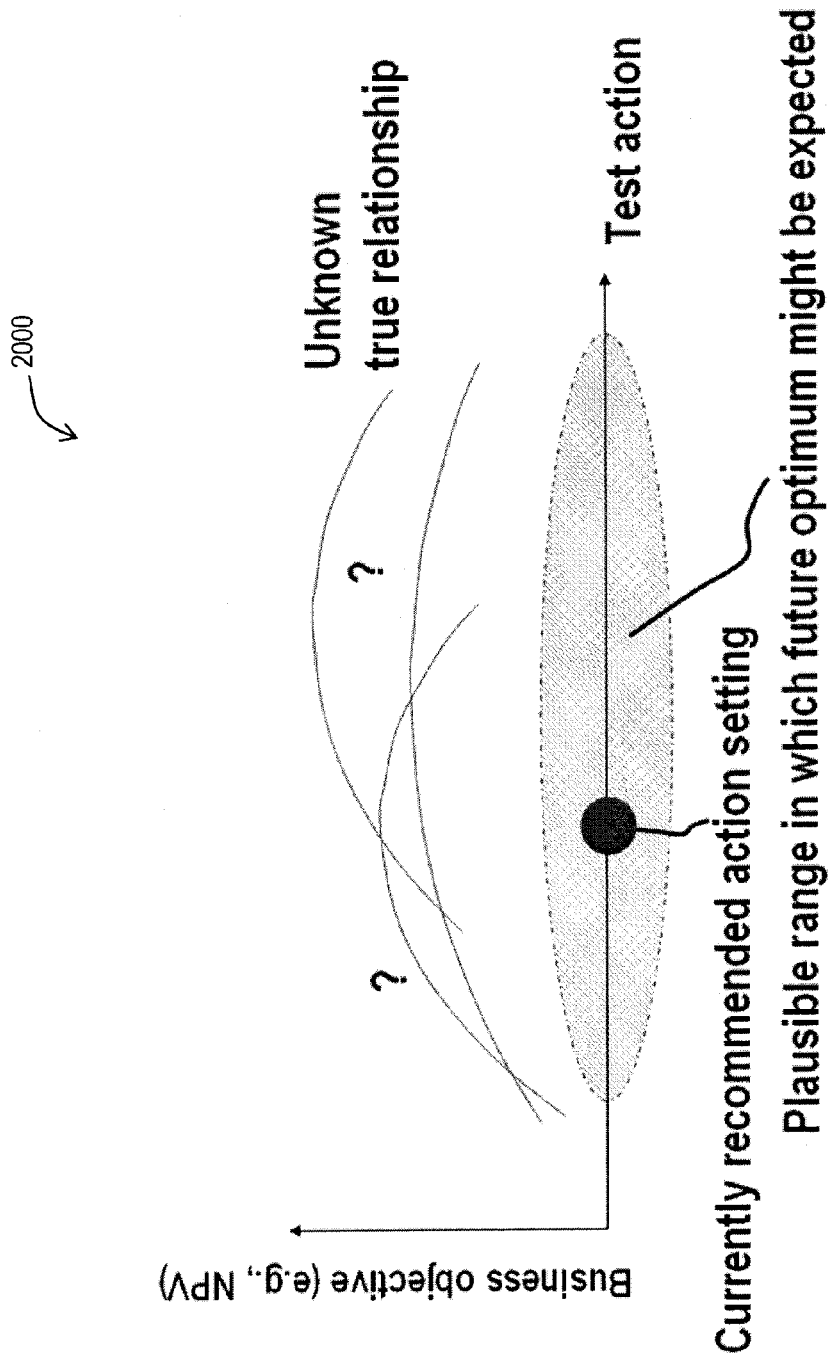
FIG. 20 represents a conceptual picture that shows how an optimal testing is performed.

FIG. 20 represents a conceptual picture that shows how an optimal testing is performed. The current recommended setting given by the optimization process (and the current decision model) is known. Testing is employed in a neighborhood of this optimal setting to maximize the amount of information collected with a minimal cost. The shaded oval represents a neighborhood around the current optimal action setting. The idea is that, unlike the classical Experimental Design, we test only in that neighborhood (as defined using the current generation of the decision model). The data collected from the test is used to build a next generation of the decision model that will achieve better real life performance (i.e. is more accurate).

Although "traditional" testing paradigms (including one-factor at a time testing, factorial designs with few factors, judgmental testing (champion-challenger design)) can also be employed, the learning strategy is beneficial because it combines constrained optimal experimental design with simulations involving the decision model to collect data in the profitable regions with maximum efficiency. This will result in faster learning in the most promising regions, as compared to traditional testing practices.

The learning strategy closes the feedback loop of the traditional adaptive control paradigm, by generating test data through learning strategy deployment, which are fed back into the development of the next generation of models and strategies.

13) Economic Stress Testing

A major challenge in predicting future mortgage risk and building action-effect models is that models are traditionally developed based on historical account level data, but the future never looks perfectly like the past. The risk of a mortgage is tied to several exogenous factors, including the economic environment, the average lending rate, movement in housing prices, regulatory policies and changes in lending practices. Consumers' reaction to lender's treatment is also tied to the economic environment, for example the existence of competing offers in the lending market. FICO has developed a methodology to effectively understand how the risk models and consumers' action-effect models change based on economic and lending factors. Using this methodology on top of the technology already described in making optimal mortgage decisions can take into consideration some of the future uncertainty.

A critical step in injecting a forward estimate of future uncertainty in mortgage portfolio optimizations is to statistically establish the relationships between projections of major economic indicator variables (such as housing index change, unemployment rate, interest rate) and consumer's performance (e.g. redefault rate, probability of able-to-pay, probability of walkway). These relationships then generate the portfolio level adjustment factors for various decision model components based on the major economic indicator variables.

For example, foreclosure rate is highly correlated with home value change. This key relationship can be captured and built into the loan modification optimization framework. This allows the mortgage portfolio manager to inject his/her outlook on the home value change in the next 6-12 months into the mortgage portfolio optimization so the optimal strategies developed in this process are based on the lender's specific outlook on this factor.

There is a second challenge in that no one can perfectly predict the future. The proposed optimization strategy should be subjected to rigorous stress-testing so the consequence in terms of loss can be measured in a worst-case scenario (such as seen in the mortgage crisis of 2008/2009).

Although a few variations have been described and illustrated in detail above, other modifications are possible. For example, the logic flow depicted in the accompanying figures and described herein does not require the particular order shown, or sequential order, to achieve desirable results. Other implementations may be within the scope of the following claims.

What is claimed is:

1. A method for implementation by one or more data processors, the method comprising:
    first applying, by at least one data processor, a decision model to a set of current data from a mortgage portfolio to generate a first portfolio metric, the decision model being formed from a network of a plurality of predictive models, the predictive models being trained on historical data derived from a plurality of mortgage account profiles for a plurality of mortgages within the mortgage portfolio, the historical data characterizing actions taken on mortgages in the mortgage portfolio, one of the predictive models being an action-based predictive model allowing modification of at least one attribute affecting performance of the mortgage portfolio;
    receiving, by the at least one data processor, data modifying at least one modifiable attribute from an action-based predictive model to form a modified attribute;
    second applying, by at least one data processor, the decision model to the set of current data from the mortgage portfolio with the modified attribute to generate a second portfolio metric;
    optimizing, by the at least one data processor, a selection of the at least one modifiable attribute from the action-based predictive models to maximize the second portfolio metric taking into account a constraint to the optimization to thereby form an optimized second portfolio metric; and
    providing, by the at least one data processor, data characterizing the optimized second portfolio metric;
    varying, by the at least one data processor, values of the at least one modifiable attribute;
    evaluating a sensitivity of the decision model based on varying values of the at least one modifiable attribute;
    testing an effect of varying the values of the at least one modifiable attribute; and
    determining an effect on the optimized portfolio based on testing an effect of varying the values of the at least one modifiable attribute.

2. A method as in claim 1, wherein the data modifying at least one attribute from one of the action-based predictive models is user-generated and obtained via a graphical user interface.

3. A method as in claim 1, wherein the at least one attribute is derived from the historical data that acts as a decision key.

4. A method as in claim 1, wherein the constraint is applied by applying, by at least one data processor, a global constraint that applies to substantially all the mortgages in the mortgage portfolio.

5. A method as in claim I, wherein the constraint is applied by applying, by the at least one data processor, a local constraint that applies to a subset of the mortgages in the mortgage portfolio.

6. A method as in claim 1, further comprising:
    assigning, by the at least one data processor, optimal actions to apply to a plurality of mortgages of the mortgage portfolio for carrying out an optimized strategy.

7. A method as in claim 1, wherein the predictive models comprise global predictive models built on all of the mortgages in the mortgage portfolio.

8. A method as in claim 1, wherein the predictive models comprise segmented predictive models built on a subset of mortgages in the mortgage portfolio.

* * * * *